US011883972B2

(12) United States Patent
Sugimoto

(10) Patent No.: US 11,883,972 B2
(45) Date of Patent: Jan. 30, 2024

(54) SLIT-CUTTING DEVICE

(71) Applicant: Brother Kogyo Kabushiki Kaisha, Nagoya (JP)

(72) Inventor: Kiyoshi Sugimoto, Kuwana (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/458,834

(22) Filed: Aug. 27, 2021

(65) Prior Publication Data

US 2021/0387369 A1 Dec. 16, 2021

Related U.S. Application Data

(62) Division of application No. 15/718,167, filed on Sep. 28, 2017, now abandoned.

(30) Foreign Application Priority Data

Mar. 31, 2017 (JP) ................................ 2017-073167

(51) Int. Cl.
*B26D 11/00* (2006.01)
*B26D 1/08* (2006.01)
(Continued)

(52) U.S. Cl.
CPC .............. *B26D 11/00* (2013.01); *B26D 1/085* (2013.01); *B26D 1/30* (2013.01); *B26D 1/305* (2013.01);
(Continued)

(58) Field of Classification Search
CPC .. B26D 11/00; B26D 1/085; B26D 2007/005; B26D 1/305; B26D 3/08; B26F 1/01;
(Continued)

(56) References Cited

U.S. PATENT DOCUMENTS 2,999,313 A * 9/1961 Emmert ............. B65H 35/0026 83/649
3,227,024 A 1/1966 Krebs
(Continued)

FOREIGN PATENT DOCUMENTS

CN 1590117 A 3/2005
CN 1718443 A 1/2006
(Continued)

OTHER PUBLICATIONS

Feb. 26, 2019—U.S. Non-Final Office Action—U.S. Appl. No. 15/718,167 (Year: 2019).*
(Continued)

*Primary Examiner* — Jonathan G Riley
(74) *Attorney, Agent, or Firm* — Banner & Witcoff, Ltd.

(57) ABSTRACT

A slit-cutting device includes a first holder, a second holder, a first contactable member a second contactable member, and a protrusion member. The first holder includes a medium faceable area and a first contactable member. The second holder holds a blade and includes a second contactable member. A cutting edge of the blade may cut a medium between the first holder and the blade. The first contactable member and the second contactable member contact each other and defined a closest approach distance between the cutting edge and the first holder. The closest approach distance is longer than zero and below a thickness of the medium. The protrusion member protrudes more than the closest approach distance from a part of the medium faceable area. The cutting edge may make a cut line includes at least a part of a slit-cut and a full-cut in a cutting edge direction in the medium.

3 Claims, 19 Drawing Sheets

(51) Int. Cl.

| | |
|---|---|
| ***B26F 1/18*** | (2006.01) |
| ***B65H 35/06*** | (2006.01) |
| ***B65H 39/16*** | (2006.01) |
| ***B41J 11/70*** | (2006.01) |
| ***B26D 3/08*** | (2006.01) |
| ***B26D 1/30*** | (2006.01) |
| ***B65H 20/02*** | (2006.01) |
| ***B65H 37/04*** | (2006.01) |
| ***B65H 18/10*** | (2006.01) |
| *B26D 7/00* | (2006.01) |

(52) U.S. Cl.

CPC ............... *B26D 3/08* (2013.01); *B26D 3/085* (2013.01); *B26F 1/18* (2013.01); *B41J 11/70* (2013.01); *B65H 18/103* (2013.01); *B65H 20/02* (2013.01); *B65H 35/06* (2013.01); *B65H 37/04* (2013.01); *B65H 39/16* (2013.01); *B26D 2007/005* (2013.01); *B65H 2301/5152* (2013.01); *B65H 2403/5332* (2013.01); *B65H 2701/12112* (2013.01); *B65H 2701/18485* (2013.01)

(58) Field of Classification Search

CPC . B26F 1/18; B41J 11/70; B65H 35/06; B65H 37/04; B65H 39/16; B65H 20/02

See application file for complete search history.

(56) References Cited

U.S. PATENT DOCUMENTS

| | | | | |
|---|---|---|---|---|
| 5,160,573 | A * | 11/1992 | Takagi | B26D 3/085 83/881 |
| 6,113,294 | A * | 9/2000 | Niwa | B41J 3/407 83/881 |
| 7,357,585 | B2 * | 4/2008 | Kurashina | B41J 3/4075 400/621 |
| 2004/0211521 | A1 | 10/2004 | Miyasaka | |
| 2004/0255737 | A1 * | 12/2004 | Sakato | B23D 31/008 83/13 |
| 2005/0061132 | A1 * | 3/2005 | Sodeyama | B41J 11/703 83/694 |
| 2006/0008608 | A1 | 1/2006 | Kurashina | |
| 2008/0069622 | A1 | 3/2008 | Sodeyama | |
| 2013/0287467 | A1 * | 10/2013 | Takahashi | B26D 3/085 400/621 |
| 2017/0321090 | A1 * | 11/2017 | Sugai | B41M 5/502 |

FOREIGN PATENT DOCUMENTS

| | | | |
|---|---|---|---|
| CN | 1919551 | A | 2/2007 |
| CN | 202847133 | U | 4/2013 |
| JP | S53-007356 | A | 1/1978 |
| JP | H06-091600 | A | 4/1994 |
| JP | H07-039578 | Y2 | 9/1995 |
| JP | 3165879 | B2 | 5/2001 |
| JP | 2001-225399 | A | 8/2001 |
| JP | 2004-243616 | A | 9/2004 |
| JP | 2005059503 | A | 3/2005 |
| JP | 2008201141 | A | 9/2008 |
| JP | 2008-238825 | A | 10/2008 |
| JP | 4337936 | B2 | 9/2009 |
| JP | 5945978 | B2 | 7/2016 |
| WO | 2012/133247 | A1 | 10/2012 |

OTHER PUBLICATIONS

Oct. 24, 2019—U.S. Final Office Action—U.S. Appl. No. 15/718,167 (Year: 2019).*

Feb. 19, 2020—U.S. Non-final Office Action—U.S. Appl. No. 15/718,167 (Year: 2020).*

Oct. 14, 2020—U.S. Final Office Action—U.S. Appl. No. 15/718,167 (Year: 2020).*

Apr. 28, 2021—U.S. Non-Final Office Action—U.S. Appl. No. 15/718,167 (Year: 2021).*

Sep. 3, 2019—(CN) Office Action—App 201711419455.7 with English Translation.

Feb. 2, 2021—(JP) Notification of Reason for Rejection—App 2017-073167.

* cited by examiner

SLIT-CUTTING DEVICE

CROSS-REFERENCE TO RELATED APPLICATIONS

This application is a divisional of U.S. patent application Ser. No. 15/718,167, filed Sep. 28, 2017, which claims priority from Japanese Patent Application No. 2017-073167 filed on Mar. 31, 2017, the content of which is incorporated herein by reference in its entirety.

FIELD OF DISCLOSURE

The disclosure relates to a slit-cutting device.

BACKGROUND

Known cutting devices include a plate to which a medium may contact and a blade that may face the plate. The cutting devices cut a medium incompletely or completely using the plate and blade. Cutting includes half cutting and full cutting. In half cutting, the cutting devices cut incompletely a medium located between the blade and plate, in a medium thickness direction, to form a non-penetrating slit in the medium. In full cutting, the cutting devices cut completely the medium located between the blade and plate, in the medium thickness direction, to divide the medium into two portions. Some of the known cutting devices includes a cutting blade for performing half cutting on a tape, which is an example of the medium, and a movable blade for performing full cutting on the tape. The cutting blade and the movable blade are disposed next to each other in a direction in which the tape is conveyed.

SUMMARY

Nevertheless, such a configuration might not enable the printer to cut a predetermined slit line including both a non-penetrating slit and a penetrating slit, into the tape, along a plane extending orthogonal to a surface of the tape, in a single cutting operation.

Accordingly, some embodiments of the disclosure provide for a slit-cutting device that may cut a slit line including both a non-penetrating slit and a penetrating slit, into a medium in a single slit-cutting operation.

A slit-cutting device includes a first holder, a second holder, a first contactable member, a second contactable member, and a protrusion member. The first holder includes a medium faceable area. The second holder holds a blade. A cutting edge of the blade may cut a medium between the first holder and the blade. The first holder includes a first contactable member. The second holder includes a second contactable member. The first contactable member and the second contactable member contact each other and defined a closest approach distance between the cutting edge and the first holder. The closest approach distance is greater than 0 and below a thickness of the medium. The protrusion member protrudes more than the closest approach distance from a part of the medium faceable area. The cutting edge may make a cut line includes at least a part of a slit-cut and a full-cut in a cutting edge direction in the medium.

BRIEF DESCRIPTION OF THE DRAWINGS

Aspects of the disclosure are illustrated by way of example and not by limitation in the accompanying figures in which like reference characters indicate similar elements.

DETAILED DESCRIPTION

Hereinafter, a slit-cutting device 100 according to a first illustrative embodiment will be described with reference to the accompanying drawings. The slit-cutting device 100 is included in a printer 1. Hereinafter, directions, e.g., top, bottom, right, left, front and rear, indicated by arrows in each drawing may be defined as orientation of the printer 1 that may be disposed in which it may be intended to be used as depicted in FIG. 1.

Figure 1:
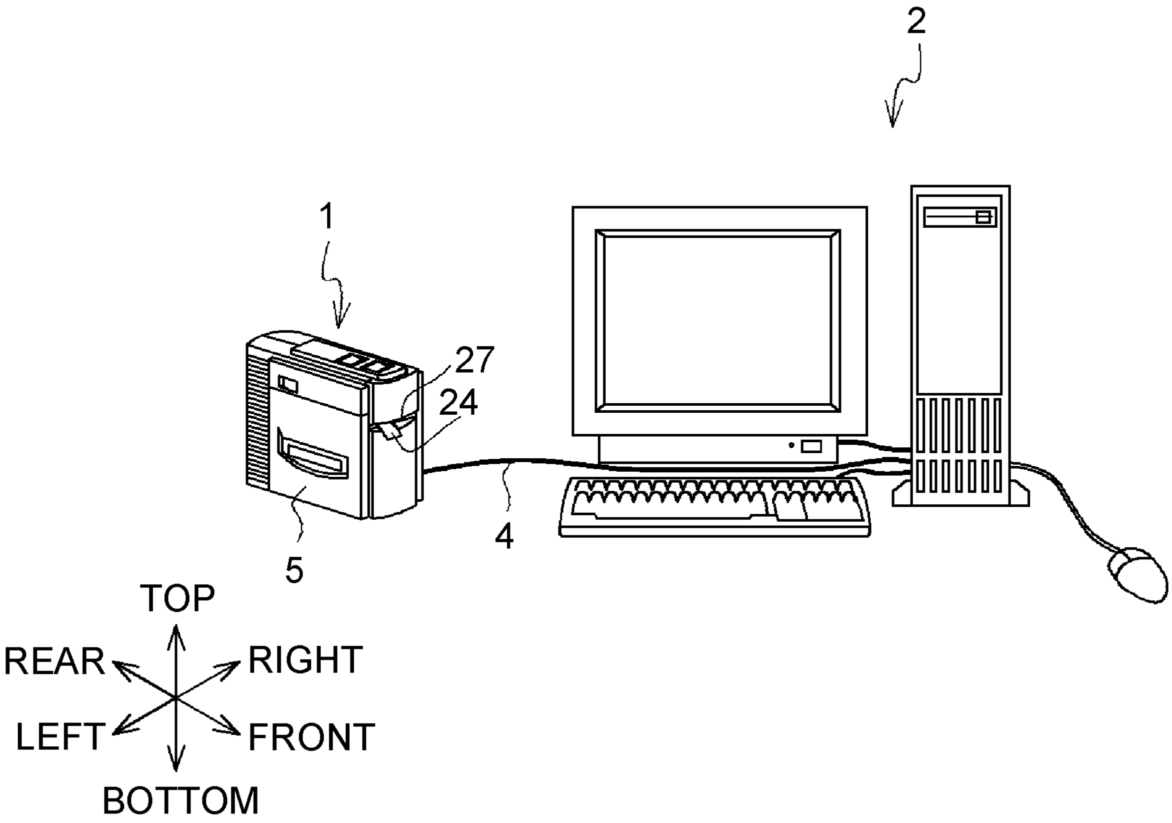
FIG. 1 is a perspective view of a printer and a data generating device in a first illustrative embodiment according to one or more aspects of the disclosure.

The printer 1 of FIG. 1 is configured to print an image, e.g., characters, letters, figures, and/or symbols, on a medium. The printer 1 may be electrically connected to a data generating device 2 via a connector 4. The data generating device 2 is configured to operate in response to a user's operation. The data generating device 2 generates image data representing an image to be printed, and transmits the generated image data to the printer 1. The data generating device 2 transmits also a print instruction and a slit-cutting operation start instruction to the printer 1 via the connector 4. The print instruction may be an instruction for printing an image onto a medium. The slit-cutting operation start instruction may be an instruction for moving a blade toward the printed medium. In the first illustrative embodiment, in the printer 1, moving the blade toward a medium may enable to both half cutting for cutting one or more non-penetrating slits in the medium and full cutting for cutting one or more penetrating slits in the medium in a single slit-cutting operation. In half cutting, the blade cuts a medium incompletely in a medium thickness direction. In other words, the blade cuts one or more non-penetrating slits in the medium. Non-penetrating slits penetrate partway in the medium but do not penetrate through the medium in the medium thickness direction. In full cutting, the blade cuts a medium completely in the medium thickness direction. In other words, the blade cuts one or more penetrating slits in the medium. Penetrating slits penetrate through the medium in the medium thickness direction. In the first illustrative embodiment, a medium may be a multi-layered sheet 24 including an outer layer sheet 8 and a double-sided adhesive sheet 13 (refer to FIG. 3). For example, the multi-layered sheet 24 may have a width of 5 cm or less in the right-left direction. Nevertheless, in other embodiments, for example, a medium to be used in the printer 1 may be a sheet consisting of a single layer or a sheet having a width of greater than 5 cm.

Figure 2:
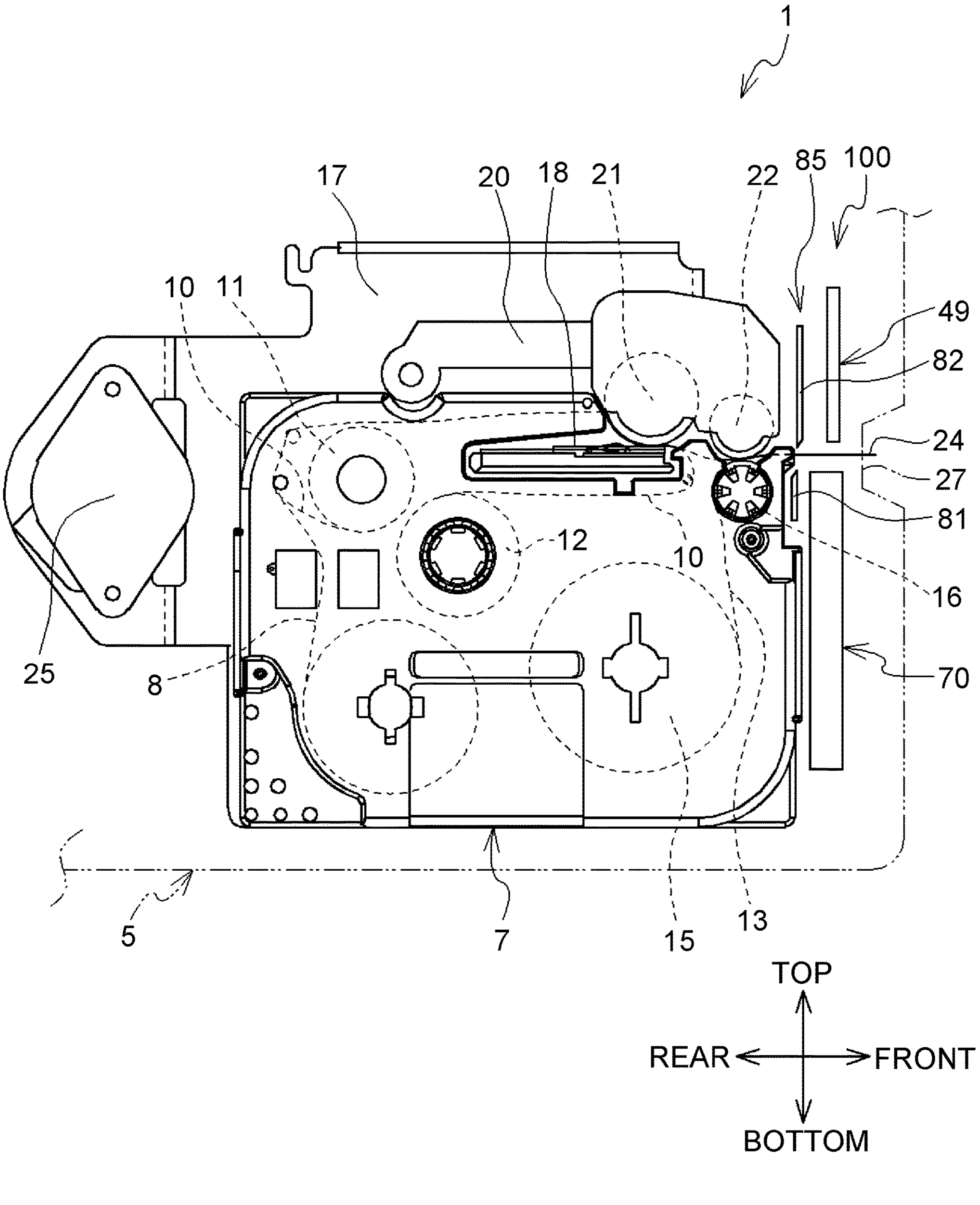
FIG. 2 is a left side view of an internal configuration of the printer in the first illustrative embodiment according to one or more aspects of the disclosure.
Figure 3:
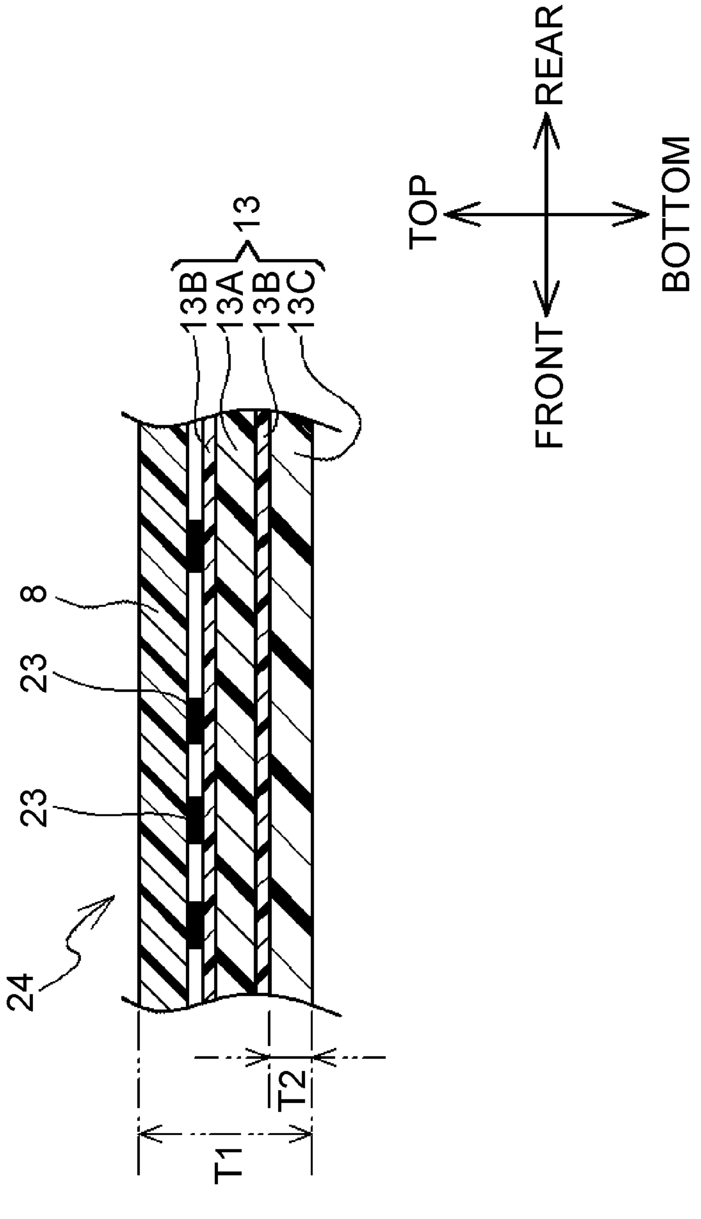
FIG. 3 is a sectional view of a multi-layered sheet in the first illustrative embodiment according to one or more aspects of the disclosure.

Referring to FIGS. 2 and 3, an internal configuration of the printer 1 will be described.

The printer 1 includes a hollow case 5. The case 5 includes an accommodating portion 17 to or from which a tape cassette 7 is attachable or detachable in the right-left direction. The tape cassette 7 includes therein a tape spool, a ribbon supply spool 11, a ribbon take-up spool 12, a base supply spool 15, and a sheet bonding roller 16. The tape spool has the transparent outer layer sheet 8, e.g., polyethylene terephthalate ("PET") film, wound therearound. The ribbon supply spool 11 has an ink ribbon 10 wound therearound. The ribbon take-up spool 12 is configured to wind the ink ribbon 10 therearound. The base supply spool 15 has a double-sided adhesive sheet 13 wound therearound. The sheet bonding roller 16 is rotatably disposed. The double-sided adhesive sheet 13 has multiple layers, for example, at least two layers (refer to FIG. 3). In the first illustrative embodiment, the double-sided adhesive sheet 13 includes a base layer 13A, adhesive layers 13B, and a release material layer 13C. The adhesive layers 13B are positioned on respective surfaces of the base layer 13A. The release material layer 13C is adhered to the adhesive layer 13B positioned on one of the surfaces of the base layer 13A. In a roll of the double-sided adhesive sheet 13 wound around the base supply spool 15, the release material layer 13C is outside and the base layer 13A is inside. The double-sided adhesive sheet 13 may be adhered to the outer layer sheet 8 via the exposed adhesive layer 13B after drawn from the base supply spool 15.

Referring to FIG. 2, a printing operation performed by the printer 1 will be described. The printer 1 further includes a thermal head 18 and a roller holder 20 in the accommodating portion 17. The printer 1 further includes a drive motor 25 in the vicinity of the accommodating portion 17. The thermal head 18 may be a plate-like member having a plurality of heating elements. The roller holder 20 holds a platen roller 21 and a conveyance roller 22 rotatably. The ribbon take-up spool 12, the conveyance roller 22, and the sheet bonding roller 16 rotate in synchronization with each other by driving of the drive motor 25. Simultaneously with this, the heating elements of the thermal head 18 generate heat. The platen roller 21 and the thermal head 18 sandwich the ink ribbon 10 and the outer layer sheet 8 therebetween. Ink 23 included in the ink ribbon 10 is transferred to a lower surface of the outer layer sheet 8 by heating of the heating elements of the thermal head 18. Thus, an image is printed on the outer layer sheet 8. The outer layer sheet 8 having the printed image is conveyed by rotation of the conveyance roller 22 and the sheet bonding roller 16 and rotation of the platen roller 21 that rotates following the rotation of the conveyance roller 22 and the sheet bonding roller 16. The conveyance roller 22 and the sheet bonding roller 16 sandwich the outer layer sheet 8 and the double-sided adhesive sheet 13 therebetween. Therefore, the outer layer sheet 8 having the printed image is adhered to the double-sided adhesive sheet 13 while its lower surface having the printed image faces the exposed adhesive layer 13B of the double-sided adhesive sheet 13. Thus, the printer 1 forms a multi-layered sheet 24 having the printed image. Subsequent to this, the multi-layered sheet 24 is conveyed to the slit-cutting device 100. The multi-layered sheet 24 has the printed image, for example, "ABC", as letters (refer to FIG. 7).

The multi-layered sheet 24 may pass through a discharge port 27 of the case 5. The ribbon take-up spool 12, the sheet bonding roller 16, and the conveyance roller 22 are connected to the drive motor 25 disposed in the case 5. Therefore, the conveyance roller 22 may convey the multi-layered sheet 24 in cooperation with the sheet bonding roller 16. A direction in which the multi-layered sheet 24 is conveyed between the conveyance roller 22 and the discharge port 27 corresponds to the front-rear direction. When the multi-layered sheet 24 is being conveyed between the conveyance roller 22 and the discharge port 27, a thickness direction of the multi-layered sheet 24 (also simply referred to as a medium thickness direction) corresponds to the top-bottom direction and a width direction of the multi-layered sheet 24 (also simply referred to as a medium width direction) corresponds to the right-left direction. When the multi-layered sheet 24 is located between the conveyance roller 22 and the discharge port 27, the release material layer 13C is positioned below the base layer 13A and the outer layer sheet 8 is positioned above the base layer 13A (refer to FIG. 3).

The printer 1 further includes a full-cutting device 85 between the conveyance roller 22 and the discharge port 27. The full-cutting device 85 is configured to cut the multi-layered sheet 24 completely in the medium thickness direction across the multi-layered sheet 24 with respect to the medium width direction to divide the multi-layered sheet 24 into two portions, i.e., to separate a portion of the multi-layered sheet 24 from the remainder of the multi-layered sheet 24. The full-cutting device 85 includes a fixed blade 81 and a movable blade 82. The fixed blade 81 is disposed below a path in which the multi-layered sheet 24 moves. The fixed blade 81 is fixed to the inside of the case 5 with its upper edge being sharpened for cutting. The movable blade 82 is disposed above the fixed blade 81 and the path in which where the multi-layered sheet 24 moves. The movable blade 82 is configured to move up and down relative to the fixed blade 81. The movable blade 82 is connected to a lever disposed at the case 5 with its lower edge being sharpened for cutting. The cutting edges of the fixed blade 81 and the movable blade 82 each extend in the right-left direction and have a length greater than the width of the multi-layered sheet 24. The movable blade 82 is configured to move downward toward the fixed blade 81 in response to a user's operation for moving the lever. The full-cutting device 85 cuts the multi-layered sheet 24 completely in the medium thickness direction along the entire width of the multi-layered sheet 24 by pinching the multi-layered sheet 24 between the lower cutting edge of the movable blade 82 and the upper cutting edge of the fixed blade 81.

Figure 4:
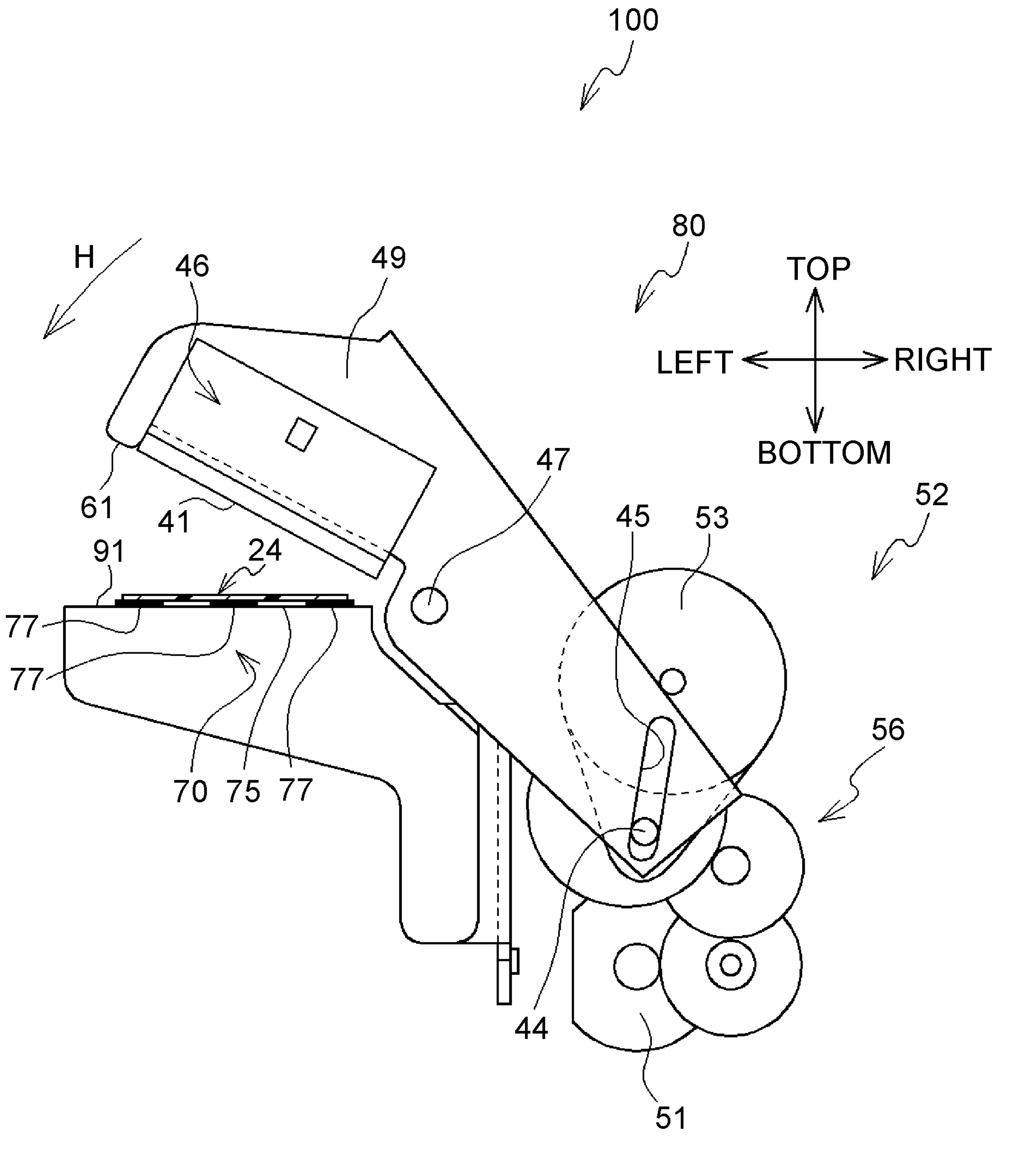
FIG. 4 is a front view of a slit-cutting device when a blade is located at a non-cutting position in the first illustrative embodiment according to one or more aspects of the disclosure.
Figure 5:
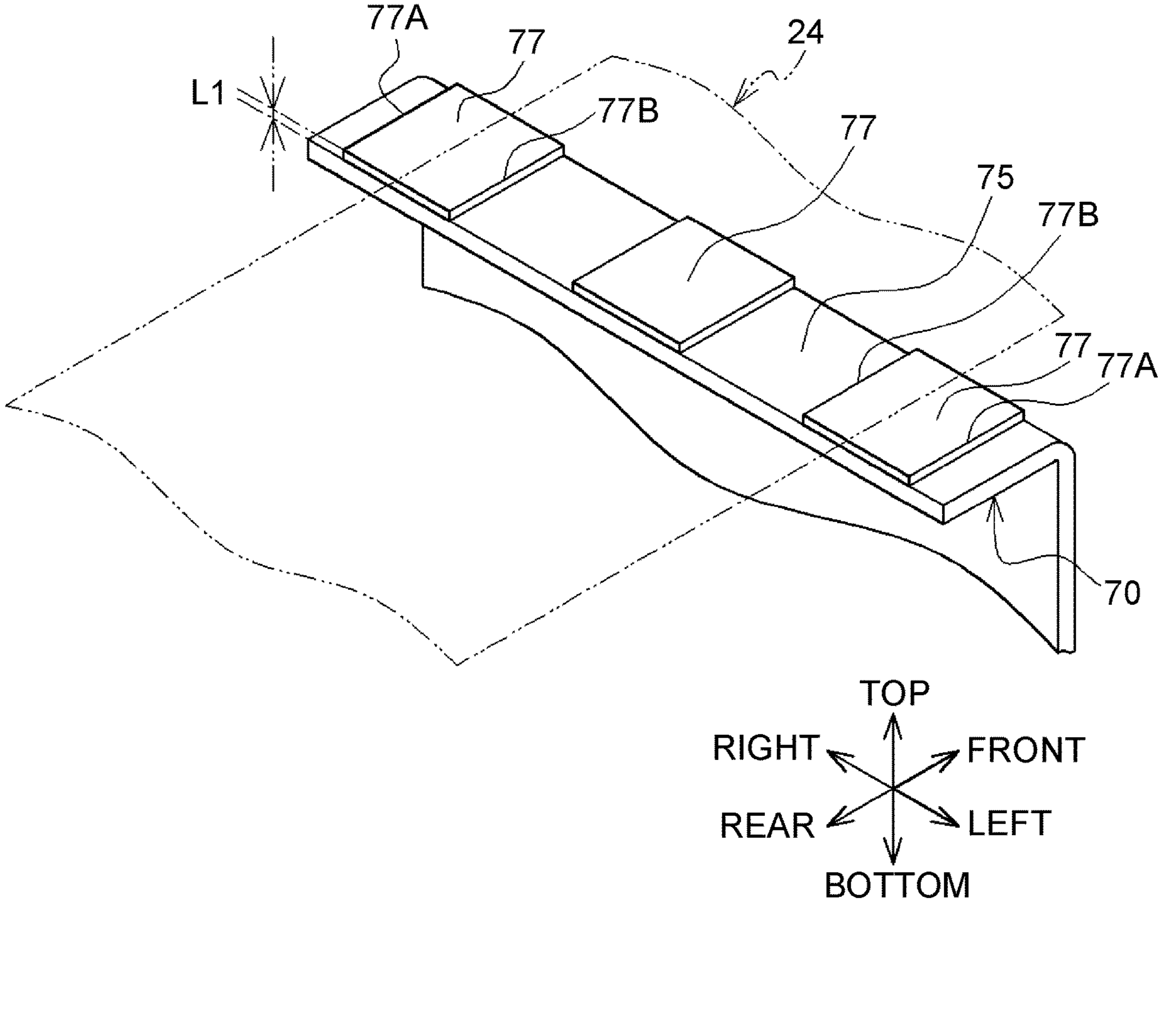
FIG. 5 is a perspective view of protrusions in the first illustrative embodiment according to one or more aspects of the disclosure.

Referring to FIGS. 4 and 5, the slit-cutting device 100 will be described. The slit-cutting device 100 is configured to cut a slit line into the multi-layered sheet 24. Cutting a slit line into the multi-layered sheet 24 may include cutting a slit line that extends between ends of the multi-layered sheet 24 with respect to the medium width direction and includes both of one or more non-penetrating slits and one or more penetrating slits, into the multi-layered sheet 24 in a single slit-cutting operation The slit-cutting device 100 is disposed between the full-cutting device 85 and the discharge port 27. The slit-cutting device 100 includes a first holder 70, a first contactable portion 91 (e.g., an area of first holder 70 is an example of a "contactable member"), and a cutting unit 80.

The first holder 70 is fixed to the inside of the case 5 (refer to FIG. 2). The first holder 70 may be made of metallic material. The first holder 70 has a medium faceable area 75. The medium faceable area 75 may be a flat surface that defines a portion of an upper end surface of the first holder 70 and extend both in the right-left direction and in the front-rear direction. The first holder 70 preferably has a flat surface that is longer than a second holder 49 in the front-rear direction so as to enable a cutting edge 41 to stably contact the multi-layered sheet 24 facing the medium faceable area 75. The medium faceable area 75 may face a portion of the multi-layered sheet 24 between the full-cutting device 85 and the discharge port 27 when the multi-layered sheet 24 is located above the medium faceable area 75. More specifically, the medium faceable area 75 may face the release material layer 13C (refer to FIG. 3) of the multi-layered sheet 24. When the multi-layered sheet 24 is located above the medium faceable area 75 with the release material layer 13C facing the medium faceable area 75, the thickness direction of the multi-layered sheet 24 corresponds to the top-bottom direction and the width direction of the multi-layered sheet 24 corresponds to the right-left direction. The medium faceable area 75 has substantially the same width in the right-left direction as the width of the multi-layered sheet 24. In the first illustrative embodiment, for example, the first contactable portion 91 is included in the first holder 70. The first contactable portion 91 defines another portion of the upper end surface of the first holder 70. More specifically, the first contactable portion 91 defines the portion that is positioned to the left of the medium faceable area 75 in the upper end surface of the first holder 70. The first contactable portion 91 is flush with the medium faceable area 75 in the top-bottom direction. A plurality of protrusions 77 are disposed at the medium faceable area 75. For example, each of the protrusions 77 may be a plate-shaped member extending both in the right-left direction and in the front-rear direction. The protrusions 77 may be made of material that may deform when a blade 46 contacts thereto. Each of the protrusions 77 may be, for example, a laminated tape. Each of the protrusions 77 is adhered to a respective portion of the medium faceable area 75. In other embodiments, the protrusions 77 may be made of other material if the protrusions 77 are deformable when the blade 46 contacts thereto. For example, the protrusions 77 may be made of resin material, e.g., sponge or rubber.

In the first illustrative embodiment, for example, three protrusions 77 are spaced from each other at regular intervals in the right-left direction. The intervals between protrusions 77 may be, for example, 24 mm or shorter. The intervals between protrusions 77 may be a maximum distance that a particular area of the multi-layered sheet 24 between adjacent protrusions 77 can be applied with an appropriate degree of force from the cutting edge 41. A protruding amount of each protrusion 77 that protrudes upward from the medium faceable area 75 corresponds to a dimension L1 of FIG. 5. The central protrusion 77 may face a middle portion of a bottom surface of the multi-layered sheet 24 in the medium width direction. The right and left protrusions 77 each have a first end 77A outside the medium faceable area 75 and a second end 77B inside the medium faceable area 75. The right protrusion 77 is disposed such that one end (e.g., a right end) of the multi-layered sheet 24 may face the right protrusion 77. In the right protrusion 77, when the multi-layered sheet 24 faces the medium faceable area 75, the first end 77A (e.g., the right end) is positioned further to the right than the right end of the multi-layered sheet 24 and outside the width range of the multi-layered sheet 24, and the second end 77B (e.g., the left end) is positioned further to the left than the right end of the multi-layered sheet 24 and inside the width range of the multi-layered sheet 24. The left protrusion 77 is disposed such that the other end (e.g., a left end) of the multi-layered sheet 24 may face the left protrusion 77. In the left protrusion 77, when the multi-layered sheet 24 faces the medium faceable area 75, the first end 77A (e.g., the left end) is positioned further to the left than the left end of the multi-layered sheet 24 and outside the width range of the multi-layered sheet 24, and the second end 77B (e.g., the right end) is positioned further to the right than the left end of the multi-layered sheet 24 and inside the width range of the multi-layered sheet 24.

As illustrated in FIG. 4, the cutting unit 80 includes a support shaft 47, a second holder 49, the blade 46, a second contactable portion 61 (e.g., an area of second holder 49 is an example of a "contactable member"), and a power transmission unit 52. The support shaft 47 is disposed such that its axis extends along the front-rear direction. The support shaft 47 has one end portion that is connected to the second holder 49, and the other end portion that is positioned in the inside of the case 5 (refer to FIG. 2). The other end portion of the support shaft 47 positioned at the case 5 is slidably engaged with a hole provided in the inside of the case 5. The support shaft 47 supports the second holder 49 so as to be pivotable. That is, the support shaft 47 supports the second holder 49 such that the second holder 49 is movable relative to the first holder 70. More specifically, the one end portion of the support shaft 47 is fixed to the second holder 49. Nevertheless, in other embodiments, for example, the other end portion of the support shaft 47 may be fixed to the inside of the case 5 and the one end portion of the support shaft 47 may be engaged with a hole of the second holder 49 so as to be slidable. Hereinafter, a direction in which the second holder 49 pivots on the support shaft 47 may simply refer to a circumferential direction of the support shaft 47. The second holder 49 has an elongated hole 45. The elongated hole 45 is elongated in a direction orthogonal to the front-rear direction. The elongated hole 45 is engaged with a pin 44.

The blade 46 is supported by the second holder 49. The blade 46 has a hole at a substantially central portion thereof. The second holder 49 includes a projection that protrudes in the front-rear direction. The projection of the second holder 49 is engaged with the hole of the blade 46 to retain the blade 46 relative to the second holder 49. The blade 46 is made of material that is harder than the protrusions 77. In the first illustrative embodiment, for example, the blade 46 may be a plate-shaped member made of metallic material. The blade 46 has a cutting edge 41 sharpened in a V-shape for cutting. The cutting edge 41 extends linearly in the right-left direction and has a length no shorter than the width of the multi-layered sheet 24 (e.g., the dimension of the multi-layered sheet 24 in the right-left direction). The support shaft 47 is positioned on an extension of the cutting edge 41. In other words, the support shaft 47 is disposed to one side of the cutting edge 41 with respect to a direction in which the cutting edge 41 extends. Portions of the cutting edge 41 may face the respective protrusions 77 in the circumferential direction of the support shaft 47 and other portions of the cutting edge 41 may face the medium faceable area 75 in the circumferential direction of the support shaft 47. That is, the cutting edge 41 may face at least both the medium faceable area 75 and the protrusions 77 in the circumferential direction of the support shaft 47.

In the first illustrative embodiment, for example, the second contactable portion 61 is included in the second holder 49. The second holder 49 includes a protruding portion that protrudes relative to the cutting edge 41. The protruding portion is disposed opposite to the support shaft 47 relative to the blade 46. The protruding portion includes the second contactable portion 61 at its protruding end. The second contactable portion 61 is a flat surface extending in the front-rear direction and in the right-left direction. The second contactable portion 61 may contact the first contactable portion 91 in the circumferential direction of the support shaft 47. In other embodiments, for example, the second contactable portion 61 may be disposed at any location that is outside, in the right-left direction, at least a range in which the cutting edge 41 may face the multi-layered sheet 24 in the circumferential direction of the support shaft 47.

The power transmission unit 52 includes a gear 53 and a motor 51. The gear 53 is configured to rotate on a shaft extending along the front-rear direction. The gear 53 includes the pin 44 extending in the front-rear direction. The pin 44 is engaged with the elongated hole 45 of the second holder 49 slidably relative to the elongated hole 45. The motor 51 is connected to the gear 53 via a gear train 56. With this configuration, in response to rotation of the gear 53 by driving of the motor 51, the pin 44 causes the second holder 49 to pivot on the support shaft 47. In response to pivoting of the second holder 49, the blade 46 moves pivotably. The blade 46 is configured to move pivotably between a non-cutting position (refer to FIG. 4) and a cutting position (refer to FIG. 6). When the blade 46 is located at the non-cutting position, the cutting edge 41 is located above and spaced from the first holder 70. In this state, the first contactable portion 91 of the first holder 70 does not contact the second contactable portion 61 of the second holder 49. When the blade 46 is located at the cutting position, the cutting edge 41 contacts the protrusions 77 and faces the medium faceable area 75 with a slight clearance left between the cutting edge 41 and the medium faceable area 75. In this state, the first contactable portion 91 of the first holder 70 is in contact with the second contactable portion 61 of the second holder 49. The distance to the blade 46 from the first holder 70 is determined at the cutting position when the second contactable portion 61 and the first contactable portion 91 are in contact with each other.

Figure 6:
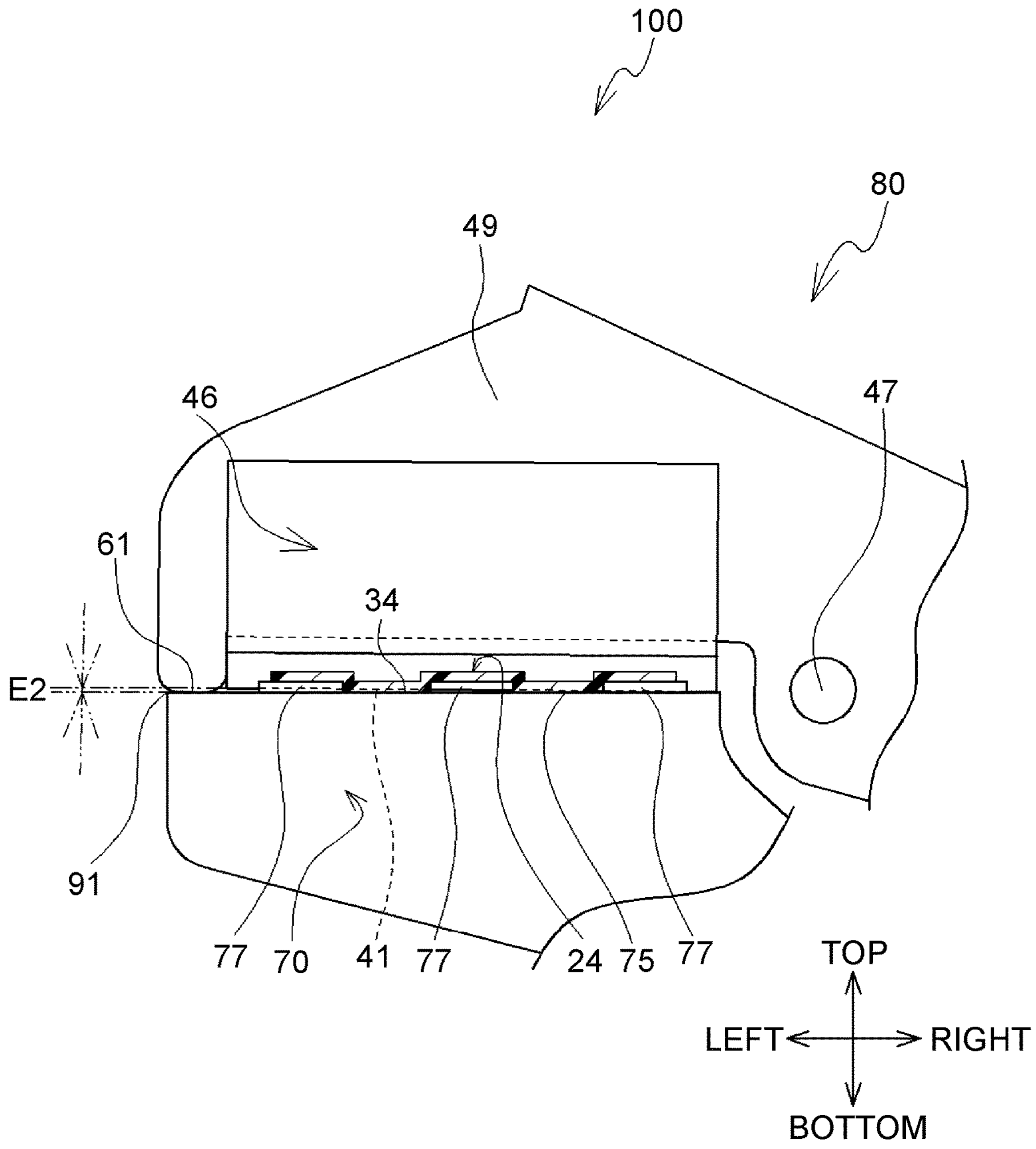
FIG. 6 is a front view of the slit-cutting device when the blade is located at a cutting position in the first illustrative embodiment according to one or more aspects of the disclosure.

Referring to FIG. 6, a first distance, a second distance, and a closest approach distance in the slit-cutting device 100 will be defined. The first distance may be a distance to the first contactable portion 91 from the medium faceable area 75 in a direction in which the cutting edge 41 and the medium faceable area 75 face each other when the first contactable portion 91 and the second contactable portion 61 are in contact with each other. The first distance may be represented by a positive or negative real number. Positive represents a direction from the medium faceable area 75 toward the cutting edge 41, and negative represents its opposite direction. In the first illustrative embodiment, the first distance is 0 (zero).

The second distance may be a distance to the second contactable portion 91 from the cutting edge 41 in the direction in which the cutting edge 41 and the medium faceable area 75 face each other when the first contactable portion 91 and the second contactable portion 61 are in contact with each other. The second distance may be represented by a positive or negative real number. Positive represents a direction from the cutting edge 41 toward the medium faceable area 75, and negative represents its opposite direction. In the first illustrative embodiment, the second distance is represented by a positive real number and corresponds to a dimension E2 of FIG. 6.

The closest approach distance may be a shortest distance between the cutting edge 41 and the medium faceable area 75 when the first contactable portion 91 and the second contactable portion 61 are in contact with each other. The closest approach distance may be a value represented by a sum of the first distance and the second distance. The sum of the first distance and the second distance is greater than 0 (zero). Therefore, in the first illustrative embodiment, the closest approach distance corresponds to the distance E2 of FIG. 6. The closest approach distance may be less than a thickness of the multi-layered sheet 24 (e.g., a dimension T1 of FIG. 3). In the first illustrative embodiment, for example, the closest approach distance is equal to or less than a thickness (e.g., a dimension T2 of FIG. 3) of the release material layer 13C (refer to FIG. 3). The closest approach distance is equal to or less than the protruding amount of each protrusion 77.

Referring to FIGS. 4, 6, 7 and 8, a slit-cutting operation performed by the slit-cutting device 100 will be described. The slit-cutting device 100 performs a slit-cutting operation subsequent to completion of a printing operation performed by the printer 1. In the slit-cutting operation, the blade 46 is located at the non-cutting position (refer to FIG. 4) initially.

Figure 7:
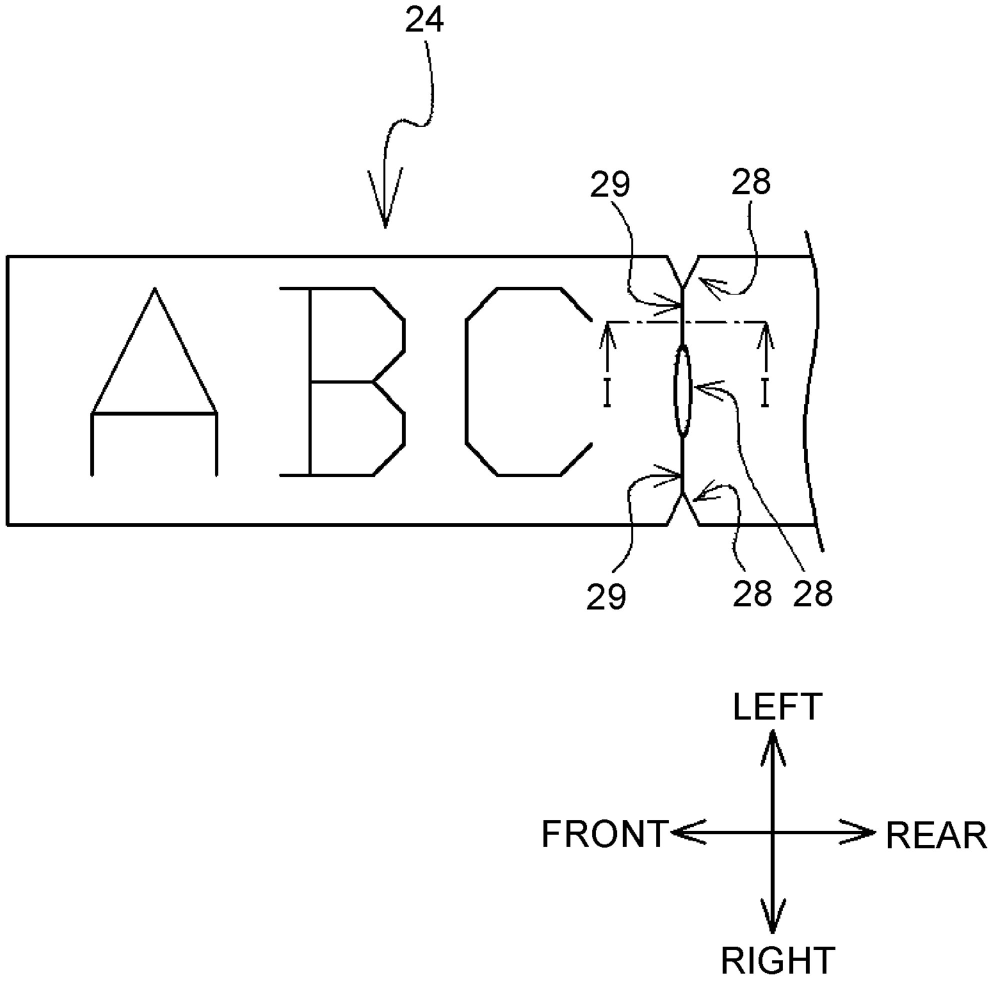
FIG. 7 is a top view of the multi-layered sheet having a slit line formed in a slit-cutting operation performed by the slit-cutting device in the first illustrative embodiment according to one or more aspects of the disclosure.
Figure 8:
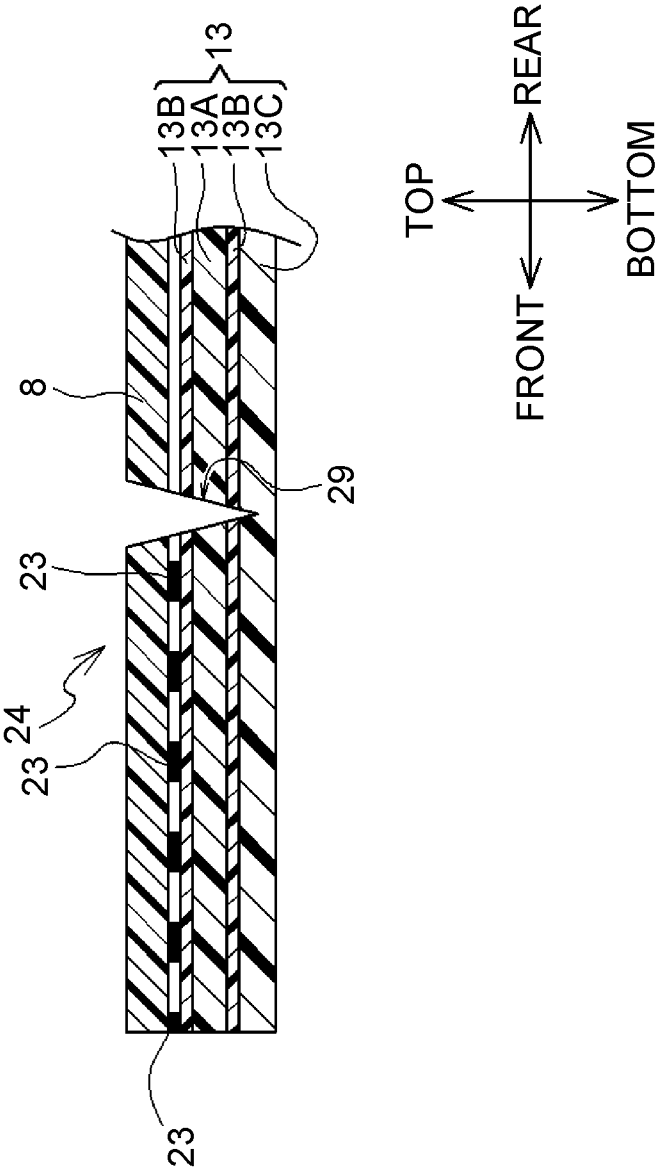
FIG. 8 is a sectional view taken along line I-I of the multi-layered sheet when viewed in an arrow direction in the first illustrative embodiment according to one or more aspects of the disclosure.

In FIGS. 4 and 6, for purposes of clear illustration, the multi-layered sheet 24 is hatched. In FIGS. 9, 10, 11, 13, 15 to 19, the multi-layered sheet 24 is also hatched. In FIG. 4, the protrusions 77 are filled with solid black. FIGS. 7 and 8 illustrate the multi-layered sheet 24 having a slit line formed in a slit-cutting operation. The cutting pattern or the types of cut slits to be formed in the multi-layered sheet 24 in a slit-cutting operation is not limited to those illustrated in FIGS. 7 and 8.

As illustrated in FIGS. 4 and 6, the blade 46 pivotally moves toward the first holder 70 from the non-cutting position (refer to an arrow H in FIG. 4) in accordance with pivoting of the second holder 49 by driving of the motor 51. In response to this, a portion, which is close to the support shaft 47 (e.g., a right end portion in the right-left direction), of the cutting edge 41 sandwiches a portion of the multi-layered sheet 24 in cooperation with the right protrusion 77. Then, a middle portion of the cutting edge 41 in the right-left direction sandwiches another portion of the multi-layered sheet 24 in cooperation with the central protrusion 77. Before the middle portion of the cutting edge 41 and the central protrusion 77 completely sandwich the corresponding portion of the multi-layered sheet 24 therebetween, the right end portion of the cutting edge 41 penetrates through the multi-layered sheet 24 at a location where the right end portion of the cutting edge 41 and the right protrusion 77 face each other. Then, a portion, which is distant from the support shaft 47 (e.g., a left end portion in the right-left direction), of the cutting edge 41 sandwiches the other portion of the multi-layered sheet 24 in cooperation with the left protrusion 77. Before the left end portion of the cutting edge 41 and the left protrusion 77 completely sandwich the other portion of the multi-layered sheet 24, the cutting edge 41 penetrates into the multi-layered sheet 24 toward the medium faceable area 75 at a location between the right protrusion 77 and the central protrusion 77 in the right-left direction. Similar to this, the cutting edge 41 penetrates into the multi-layered sheet 24 toward the medium faceable area 75 at another location between the central protrusion 77 and the left protrusion 77 in the right-left direction. Then, the left end portion of the cutting edge 41 penetrates through the multi-layered sheet 24 at another location where the left end portion of the cutting edge 41 and the left protrusion 77 face each other. Thus, a slit line including both non-penetrating slits and penetrating slits is cut into the multi-layered sheet 24 across the multi-layered sheet 24 with respect to the medium width direction.

The blade 46 further pivotally moves to the cutting position. The blade 46 is positioned at the cutting position through contacting of the second contactable portion 61 and the first contactable portion 91 each other. In response to positioning of the blade 46 at the cutting position, the motor 51 stops driving for moving the second holder 49. In a state where the blade 46 is positioned at the cutting position, the cutting edge 41 extends in the right-left direction at substantially the same level in the top-bottom direction as the axis of the support shaft 47 while being located above the medium faceable area 75.

Referring to FIGS. 6, 7, and 8, a state of each of the blade 46, the protrusions 77, and the multi-layered sheet 24 when the blade 46 has reached the cutting position will be described. The protruding amount (e.g., the dimension L1 of FIG. 5) of each protrusion 77 is greater than or equal to the closest approach distance. When the blade 46 is located at the cutting position, the cutting edge 41 penetrates through the multi-layered sheet 24 at particular locations where the cutting edge 41 faces the protrusions 77 disposed at the first holder 70, and contacts the protrusions 77. Therefore, the cutting edge 41 has cut the entire thickness of the multi-layered sheet 24 at three locations where the cutting edge 41 faces the protrusions 77, and penetrates in the protrusions 77. That is, the cutting edge 41 has cut the entire thickness of the outer layer sheet 8, the base layer 13A, the adhesive layers 13B, and the release material layer 13C of the multi-layered sheet 24 at the particular locations where the cutting edge 41 faces the protrusions 77. In this state, an upper surface of each of the protrusions 77 has been deformed in response to penetration of the blade 46 such that its portion to which the cutting edge 41 contacts is depressed or cut. The upper surface of each of the protrusions 77 may be elastically or plastically deformable.

The closest approach distance is equal to or less than the thickness of the release material layer 13C and is greater than 0 (zero). When the blade 46 is located at the cutting position, the cutting edge 41 penetrates in the multi-layered sheet 24 at locations where no protrusion 77 is provided at the first holder 70 and the cutting edge 41 does not face the protrusions 77, and more specifically, at a location between the right protrusion 77 and the central protrusion 77 and a location between the central protrusion 77 and the left protrusion 77 in the right-left direction. In other words, the cutting edge 41 penetrates only partial thickness of the release material layer 13C of the multi-layered sheet 24 at those locations. Thus, the cutting edge 41 pinches the multi-layered sheet 24 in cooperation with the medium faceable area 75 and has cut the multi-layered sheet 24 incompletely in the medium thickness direction at two locations where the cutting edge 41 and the medium faceable area 75 face each other. More specifically, for example, the cutting edge 41 has cut the entire thickness of the outer layer sheet 8, the base layer 13A, and the adhesive layers 13B, but has cut the partial thickness of the release material layer 13C, e.g., only an upper portion of the release material layer 13C in the medium thickness direction.

After the blade 46 reached the cutting position, the motor 51 rotates in an opposite direction to move the blade 46 in an opposite direction. In response to this, the blade 46 pivotally moves to the non-cutting position (refer to FIG. 4). Through such a slit-cutting operation, as illustrated in FIG. 7, a slit line including both penetrating slits 28 and non-penetrating slits 29 has cut alternately in the multi-layered sheet 24 across the multi-layered sheet 24 with respect to the medium width direction. Penetrating slits 28 are cut slits that completely penetrate or penetrate through the multi-layered sheet 24 in the medium thickness direction. Non-penetrating slits 29 are cut slits that incompletely penetrate or penetrate partway in the multi-layered sheet 24 in the medium thickness direction. In the first illustrative embodiment, for example, three penetrating slits 28 are cut in the multi-layered sheet 24. One of the penetrating slits 28 is formed in a middle portion of the multi-layered sheet 24 in the medium width direction and the others of the penetrating slits 28 are formed in respective end portions of the multi-layered sheet 24 in the medium width direction. Further, two non-penetrating slits 28 are cut in the multi-layered sheet 24. Each of the non-penetrating slits 28 is formed between adjacent two of the penetrating slits 28 in the medium width direction.

Referring to FIG. 2, a full-cutting operation performed by the full-cutting device 85 will be described. Subsequent to completion of the slit-cutting operation performed by the slit-cutting device 100, the user operates the lever (not illustrated) to manually move the movable blade 82 toward the fixed blade 81. In response to this, the full-cutting device 85 cuts the multi-layered sheet 24 completely in the medium thickness direction along the entire width of the multi-layered sheet 24 by pinching the multi-layered sheet 24 between the lower cutting edge of the movable blade 82 and the upper cutting edge of the fixed blade 81. Therefore, a portion of the multi-layered sheet 24 is separated from the remainder of the multi-layered sheet 24 at its boundary to which the lower cutting edge of the movable blade 82 contacts. Thus, the user may take out, from the printer 1, the separated portion of the multi-layered sheet 24 on which the printing operation and the slit-cutting operation have been performed. Nevertheless, the full-cutting device 85 might not necessarily be operated manually by the user. In other embodiments, for example, the full-cutting device 85 may be configured to move the movable blade 82 automatically to separate a portion of the multi-layered sheet 24 from the remainder by driving of the motor 51 subsequent to completion of the slit-cutting operation performed by the slit-cutting device 100.

As described above, the range in which the second holder 49 supported by the support shaft 47 moves relative to the first holder 70 corresponds to the range in which the cutting edge 41 moves closer to or away from the multi-layered sheet 24. The closest approach distance (e.g., the dimension E2 of FIG. 6) is greater than 0 (zero) and less than the thickness of the multi-layered sheet 24 (e.g., the dimension T1 of FIG. 3). In other words, the thickness of the multi-layered sheet 24 is a length of the multi-layered sheet 24 in a direction defined the closest approach distance when t the multi-layered sheet 24 is between the first holder 70 and the second holder 49. The protruding amount (e.g., the dimension L1 of FIG. 5) of each protrusion 77 is greater than or equal to the closest approach distance. Therefore, when the blade 46 reaches the cutting position, penetrating slits are cut into the multi-layered sheet 24 at respective locations where the cutting edge 41 faces the protrusions 77 and non-penetrating slits are cut into the multi-layered sheet 24 at the other locations where the cutting edge 41 faces the medium faceable area 75. Thus, in a single slit-cutting operation, one or more non-penetrating slits and one or more penetrating slits are both formed in the multi-layered sheet 24 along the cutting edge 41 of the blade 46 located at the cutting position. Accordingly, the first illustrative embodiment may implement the slit-cutting device 100 that may cut, into the multi-layered sheet 24, a predetermined slit line including both a non-penetrating slit and a penetrating slit, across the multi-layered sheet 24 with respect to the medium width direction, in a single slit-cutting operation.

The right protrusion 77 is disposed at a position where the right end the multi-layered sheet 24 may face. The left protrusion 77 is disposed at a position where the left end the multi-layered sheet 24 may face. This configuration may therefore enable the slit-cutting device 100 to cut a penetrating slit into each end portion of the multi-layered sheet 24 in the right-left direction (e.g., in the medium width direction). Thus, the user may put a fingertip at one of the penetrating slits formed in the respective end portions of the multi-layered sheet 24 in the right-left direction to remove the outer layer sheet 8 and the base layer 13A from the release material layer 13C. Such a multi-layered sheet 24 may therefore enable the user to easily remove the outer layer sheet 8 and the base layer 13A from the release material layer 13C.

When the multi-layered sheet 24 is located above the medium faceable area 75, the right end of the multi-layered sheet 24 is positioned between the first end 77A and the second end 77B of the right protrusion 77 in the right-left direction. That is, the right protrusion 77 has a surface that continuously extends between a particular position, which is to the left of the right end of the multi-layered sheet 24 within the medium faceable area 75, and another particular position, which is to the right of the right end of the multi-layered sheet 24 out of the medium faceable area 75. When the multi-layered sheet 24 is located above the medium faceable area 75, the left end of the multi-layered sheet 24 is positioned between the first end 77A and the second end 77B of the left protrusion 77 in the right-left direction. That is, the left protrusion 77 has a surface that continuously extends between a particular position, which is to the right of the left end of the multi-layered sheet 24 within the medium faceable area 75, and another particular position, which is to the left of the right end of the multi-layered sheet 24 out of the medium faceable area 75. This configuration may therefore the blade 46 that pivotally moves toward the cutting position to cut a penetrating slit into each end portion of the multi-layered sheet 24 in the medium width direction readily and reliably.

The closest approach distance may be a value represented by a sum of the first distance and the second distance. During manufacturing the slit-cutting device 100, if each of the first distance and the second distance is adjusted with reference to the value represented by the sum of the first distance and the second distance, the closest approach distance may be allowed to be set to a value that is greater than 0 (zero) and smaller than the thickness of the multi-layered sheet 24. For example, if one of the first distance and the second distance is greater than the dimension E2, the other of the first distance and the second distance may be reduced by an excess amount from the dimension E2 to make the sum of the first distance and the second distance equal to the dimension E2. Therefore, the slit-cutting device 100 having such a configuration may also cut a non-penetrating slit into the multi-layered sheet 24 reliably.

The first contactable portion 91 and the second contactable portion 61 are both disposed opposite to the support shaft 47 with respect to the cutting edge 41. This configuration may decrease a reaction force to be received by the support shaft 47 in response to contact of the second contactable portion 61 to the first contactable portion 91 as compared with a case where the first contactable portion 91 and the second contactable portion 61 are both disposed on the same side at the side where the support shaft 47 is disposed with respect to the cutting edge 41. The closest approach distance is equal to or less than the thickness of the release material layer 13C. Therefore, the slit-cutting device 100 may reliably cut the entire thickness of both of the outer layer sheet 8 and the base layer 13A to form a non-penetrating slit 29.

Various changes or modifications may be applied to the slit-cutting device 100. For example, the orientation of the printer 1 when used is not limited to the orientation of the printer 1 of FIG. 1. In other example, the printer 1 including the slit-cutting device 100 may be oriented when used such that the right side surface or the left side surface of the case 5 may contact a horizontal plane. In this case, the tape cassette 7 may be oriented such that its surface extending both in the top-bottom direction and in the right-left direction in FIG. 1 may face the horizontal plane, and the tape cassette 7 may be attachable to and detachable from the accommodating portion 17 in the top-bottom direction. When the multi-layered sheet 24 is drawn from the tape cassette 7 in this state, the width direction of the multi-layered sheet 24 may correspond to the top-bottom direction and the thickness direction of the multi-layered sheet 24 may correspond to the right-left direction. The medium faceable area 75 of the first holder 70 and the protrusions 77 may be disposed so as to extend along the top-bottom direction. The second holder 49 may be configured to pivot in the circumferential direction of the support shaft 47 such that the cutting edge 41 of the blade 46 moves toward the medium faceable area 75. The multi-layered sheet 24 drawn from the tape cassette 7 may be positioned between the medium faceable area 75 and the cutting edge 41 while the width direction of the multi-layered sheet 24 corresponds to the top-bottom direction. In this state, also, the release material layer 13C of the multi-layered sheet 24 may face the medium faceable area 75. In response to pivoting of the second holder 49, the cutting edge 41 may contact the multi-layered sheet 24. As the second holder 49 further pivots in the direction in which the cutting edge 41 moves closer to the medium faceable area 75, the cutting edge 41 may press the multi-layered sheet 24 to contact the release material layer 13C to the protrusions 77 disposed at the medium faceable area 75. When the cutting edge 41 contacts the multi-layered sheet 24 and the multi-layered sheet 24 contacts the protrusions 77, a relationship among the cutting edge 41, the multi-layered sheet 24, the protrusions 77, and the medium faceable area 75 are as illustrated in FIG. 6. Accordingly, the slit-cutting device 100 may cut, into the multi-layered sheet 24, a predetermined slit line including non-penetrating slits and penetrating slits, across the multi-layered sheet 24 with respect to the medium width direction, in a single slit-cutting operation.

The first holder 70 of the slit-cutting device 100 might not necessarily be fixed to the case 5. In other embodiments, for example, the first holder 70 may be supported inside the case 5 so as to be movable relative to the second holder 49. In this case, the first holder 70 and the second holder 49 may be both supported inside the case 5 so as to be movable relative to a conveyance path of the multi-layered sheet 24.

In other embodiments, for example, the protrusions 77 may be made of resin, e.g., urethane or silicone, or may be made of fabric. The first contactable portion 91 and the second contactable portion 61 may be disposed on the same side as the side where the support shaft 47 is disposed, with respect to the direction in which the cutting edge 41 extends. The first holder 70 may be configured to pivot on another shaft (not illustrated) extending parallel to the support shaft 47. In this case, the first holder 70 may be connected to another motor (hereinafter, referred to as a specific motor) instead to the motor 51 (refer to FIG. 4). The specific motor and the motor 51 may drive in synchronization with each other to pivot the first holder 70 and the second holder 49, respectively, in a direction in which the first holder 70 and the second holder 49. This configuration may enable the slit-cutting device 100 to perform a slit-cutting operation on the multi-layered sheet 24.

Figure 9:
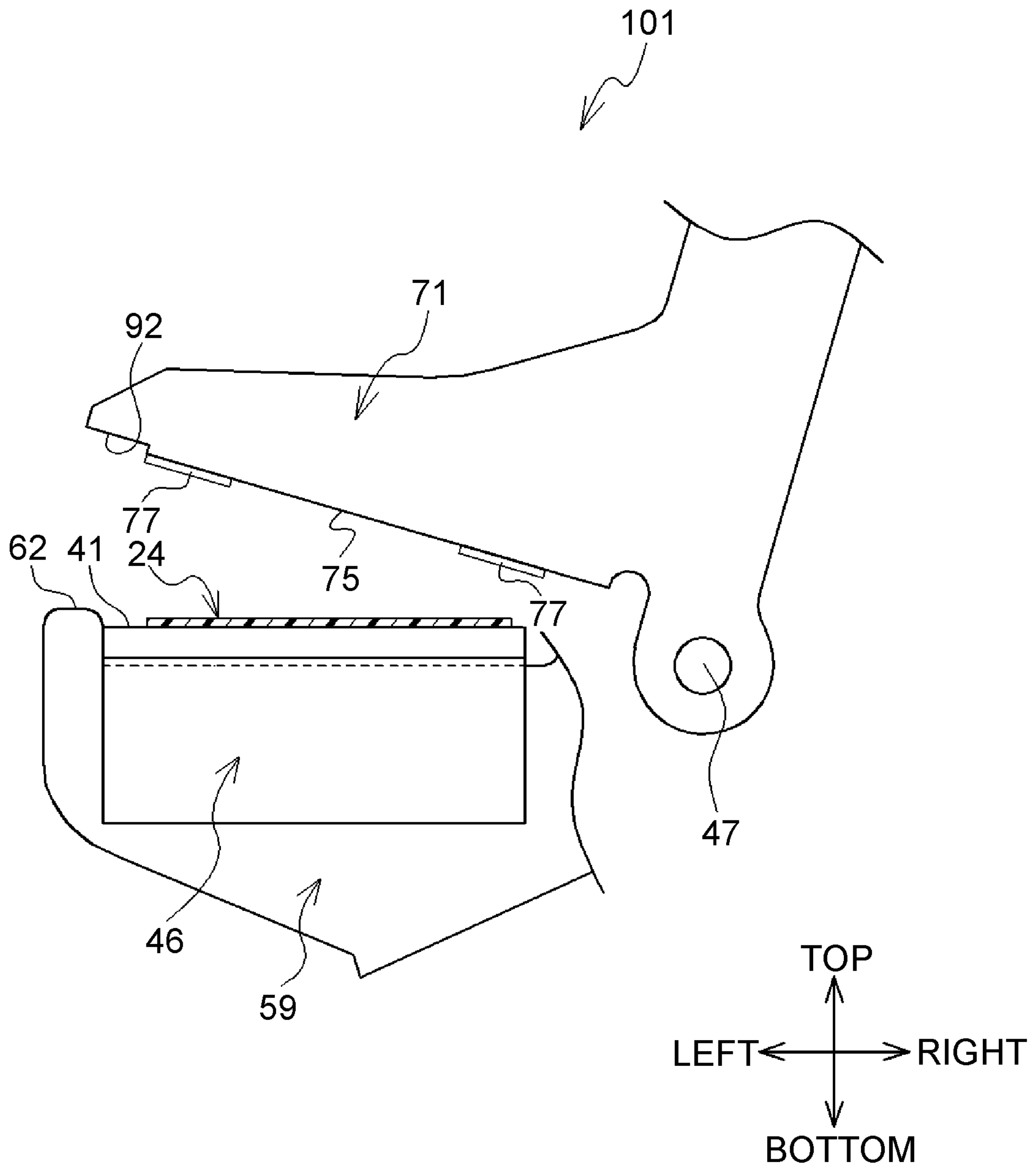
FIG. 9 is a front view of a slit-cutting device in a variation of the first illustrative embodiment according to one or more aspects of the disclosure.
Figure 10:
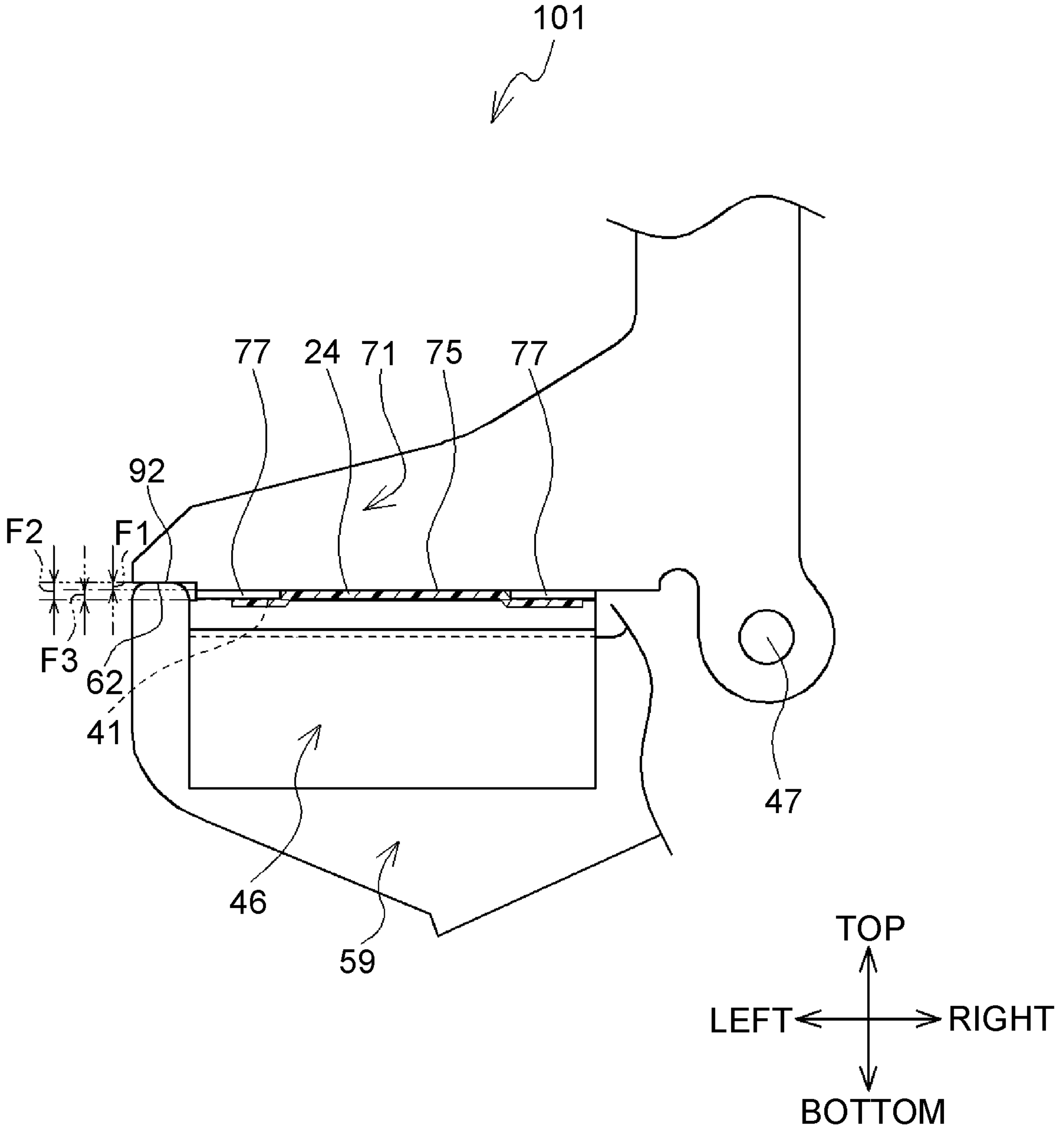
FIG. 10 is a front view of the slit-cutting device in another state in the variation of the first illustrative embodiment according to one or more aspects of the disclosure.

Referring to FIGS. 9 and 10, a slit-cutting device 101 which may be a variation of the slit-cutting device 100 will be described. An explanation will be given mainly for the parts different from the slit-cutting device 100 of the first illustrative embodiment, and an explanation will be omitted for the common components by assigning the same reference numerals thereto. The slit-cutting device 101 includes a support member (for instance, support shaft 47), a second holder 59, a first contactable portion 92, and a first holder 71, a second contactable portion 62. The support member is fixed to the inside of the case 5. The multi-layered sheet 24 may be positioned with its outer layer sheet 8 facing the support member. That is, the multi-layered sheet 24 may be positioned upside down as compared with the multi-layered sheet 24 positioned in the slit-cutting device 100. The support member is configured to support the multi-layered sheet 24 from below with contacting the outer layer sheet 8. When the multi-layered sheet 24 is supported by the support member, a thickness direction of the multi-layered sheet 24 corresponds to the top-bottom direction and a width direction of the multi-layered sheet 24 corresponds to the right-left direction. The second holder 59 is fixed to the inside of the case 5. The second holder 59 supports a blade 46. In the slit-cutting device 101, the blade 46 has a cutting edge 41 at its upper edge. The cutting edge 41 extends linearly in the right-left direction. The cutting edge 41 may contact the outer layer sheet 8 of the multi-layered sheet 24 supported by the support member along a direction in which the cutting edge 41 extends. The second holder 59 includes a protruding portion at its left end portion. The protruding portion protrudes relative to the cutting edge 41 and includes the second contactable portion 62 at its protruding end. The second contactable portion 62 is a flat surface extending in the front-rear direction and in the right-left direction.

The first holder 71 is pivotably supported by the support shaft 47 that is positioned at a right end portion of the first holder 71. That is, the first holder 71 is movable relative to the second holder 59. The first holder 71 has an elongated hole (not illustrated). The pin 44 (refer to FIG. 4) is engaged with the elongated hole of the first holder 71 so as to be slidable relative to the elongated hole. This configuration may enable the first holder 71 to pivot on the support shaft 47 by driving of the motor 51 (refer to FIG. 4).

The first holder 71 has a medium faceable area 75 at one end surface thereof that may be a leading end surface when the first holder 71 pivots on the support shaft 47 in a counterclockwise direction when viewed in the axial direction of the support shaft 47. The medium faceable area 75 may face the release material layer 13C of the multi-layered sheet 24 supported by the support member. A plurality of, for example, two protrusions 77 are disposed at the medium faceable area 75. The protrusion 77 (e.g., the right protrusion 77) positioned closer to the support shaft 47 than the other protrusion 77 may face the right end of the multi-layered sheet 24. The other protrusion (e.g., the left protrusion 77) positioned farther from the support shaft 47 than the one protrusion 77 may face the left end of the multi-layered sheet 24. A protruding amount of each protrusion 77 that protrudes from the medium faceable area 75 toward the cutting edge 41 corresponds to the protruding amount of each protrusion 77 of the slit-cutting device 100 (e.g., the dimension L1 of FIG. 5). The first contactable portion 92 is included in the first holder 71. The first contactable portion 92 is a recessed portion that is recessed relative to the medium faceable area 75.

Referring to FIG. 10, a first distance, a second distance, and a closest approach distance in the slit-cutting device 101 will be defined. An absolute value of the first distance may be a shortest distance between an extension of the medium faceable area 75 of the first holder 71 and the first contactable portion 92, and correspond to a dimension F1. An absolute value of the second distance may be a shortest distance between an extension of the cutting edge 41 of the blade 46 of the second holder 59 and the second contactable portion 62, and correspond to a dimension F2. A closest approach distance may be a shortest distance between the medium faceable area 75 and the cutting edge 41 when the first contactable portion 92 and the second contactable portion 62 are in contact with each other. The closest approach distance may correspond to a dimension F3. In the slit-cutting device 101, the first distance is represented by a negative real number, and the second distance is represented by a positive real number. The closest approach distance may be a value represented by a sum of the first distance and the second distance. The closest approach distance may be equal to or less than a thickness of the release material layer 13C (refer to FIG. 3) of the multi-layered sheet 24. The closest approach distance in the slit-cutting device 101 is equal to the closest approach distance in the slit-cutting device 100 (e.g., the dimension E1 of FIG. 6).

As illustrated in FIGS. 9 and 10, the first holder 71 pivots on the support shaft 47 toward the blade 46 by driving of the motor 51 (refer to FIG. 4). As the first contactable portion 92 and the second contactable portion 62 contact each other, the blade 46 reaches the cutting position and the motor 51 stops driving for pivoting the first holder 71. The protruding amount of each protrusion 77 from the medium faceable area 75 is greater than or equal to the closest approach distance. Therefore, when the blade 46 reaches the cutting position, the cutting edge 41 and the protrusions 77 pinch the multi-layered sheet 24 therebetween and thus a penetrating slit is cut into the multi-layered sheet 24 at each location where the cutting edge 41 and a corresponding one of the protrusions 77 face each other. In this state, the cutting edge 41 penetrates into the protrusions 77. On the other hand, the closest approach distance is less than the thickness of the multi-layered sheet 24. Therefore, when the blade 46 reaches the cutting position, the cutting edge 41 and the medium faceable area 75 pinch the multi-layered sheet 24 therebetween and thus a non-penetrating slit is cut into the multi-layered sheet 24 at a location where the cutting edge 41 and the medium faceable area 75 face each other. That is, the release material layer 13C is cut incompletely in the medium thickness direction. Accordingly, the slit-cutting device 101 may cut, into the multi-layered sheet 24, a predetermined slit line including both a non-penetrating slit and penetrating slits, across the multi-layered sheet 24 with respect to the medium width direction, in a single slit-cutting operation.

Referring to FIGS. 11 to 14, a slit-cutting device 200 according to a second illustrative embodiment will be described. An explanation will be given mainly for the parts different from the slit-cutting device 100 of the first illustrative embodiment, and an explanation will be omitted for the common components by assigning the same reference numerals thereto.

The slit-cutting device 200 includes a protrusion 78 instead of the protrusions 77. The protrusion 78 is disposed at a substantially middle portion of a medium faceable area 75 of a first holder 70 in the right-left direction. The medium faceable area 75 may face end portions of the multi-layered sheet 24 in the medium width direction. The protrusion 78 includes a plurality of, for example, two walls 79. The walls 79 extend along the right-left direction. The walls 79 are spaced from each other to define therebetween a predetermined area 75A in the medium faceable area 75 and are disposed next to each other in the front-rear direction. The predetermined area 75A is included in the medium faceable area 75. The predetermined area 75A may face a middle portion of the cutting edge 41 that moves pivotably in the circumferential direction of the support shaft 47. A protruding amount of the protrusion 78 that protrudes from the medium faceable area 75 toward the cutting edge 41 corresponds to a dimension L2 in FIG. 12. The protruding amount of the protrusion 78 corresponds to a height of the walls 79. Each of the walls 79 has an upper end surface 79A and side end surfaces 79B. The upper end surface 79A may face and contact a middle portion of the release material layer 13C (refer to FIG. 3) in the medium width direction. The side end surfaces 79B are disposed to the respective sides of the upper end surface 79A in each wall 79B in the right-left direction. The side end surfaces 79B extend diagonally downward from the upper end surface 79A in opposite directions with respect to the right-left direction.

The slit-cutting device 200 includes a first contactable portion 93 instead of the first contactable portion 91 of the first illustrative embodiment. The first holder 70 includes a protruding portion disposed to the left of the medium faceable area 75. The protruding portion protrudes relative to the medium faceable area 75. The protruding portion includes the first contactable portion 93 at its protruding end. The first contactable portion 93 is a flat surface extending in the front-rear direction and in the right-left direction. The slit-cutting device 200 further includes a second contactable portion 63 instead of the second contactable portion 61 of the first illustrative embodiment. The second contactable portion 63 is included in a second holder 49. The second contactable portion 63 is a flat surface that is disposed opposite to the first holder 70 relative to the cutting edge 41 in the circumferential direction of the support shaft 47. The second contactable portion 63 may face the first contactable portion 93 in the circumferential direction of the support shaft 47.

Figure 13:
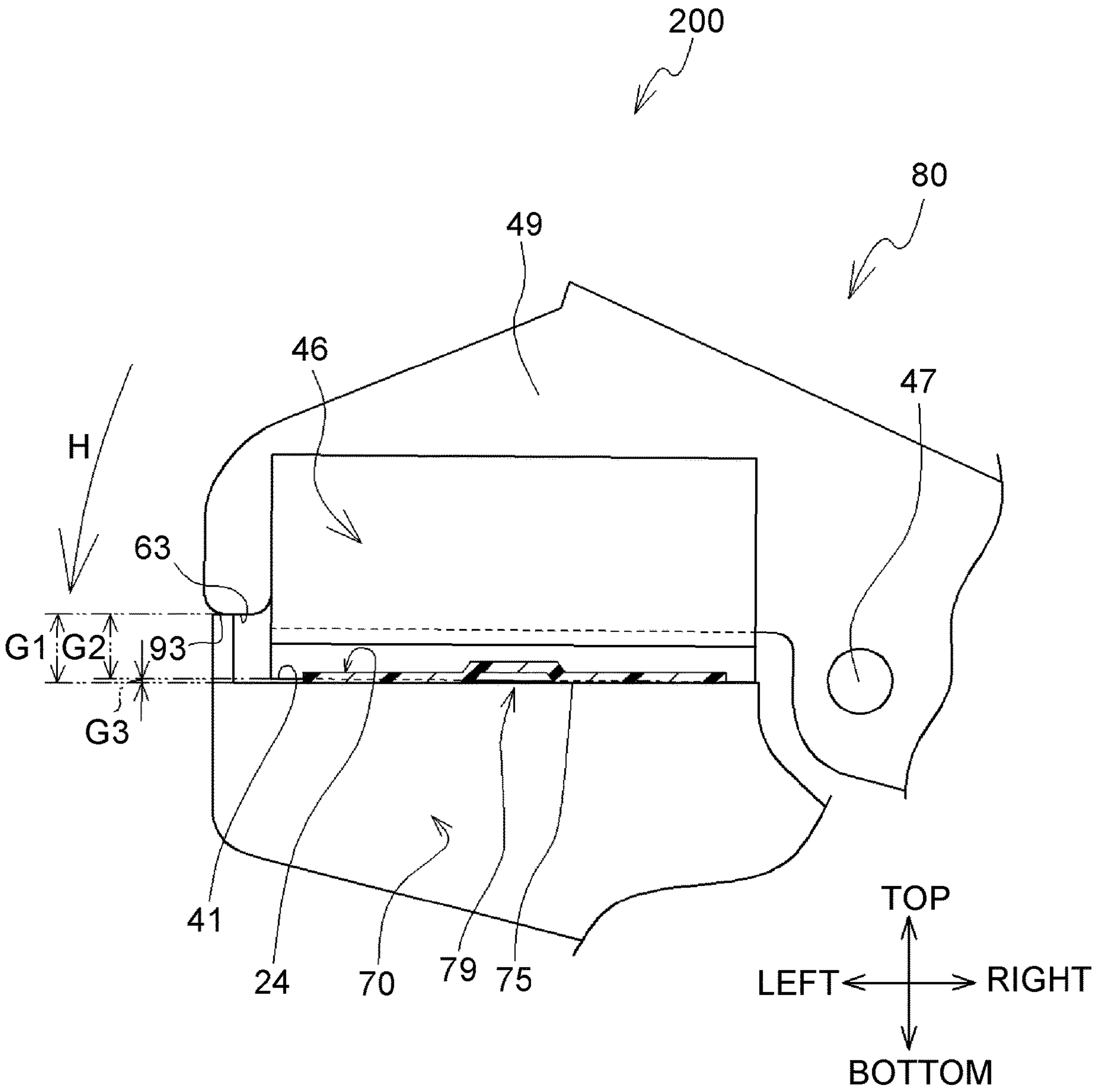
FIG. 13 is a front view of the slit-cutting device when the blade is located at a cutting position in the second illustrative embodiment according to one or more aspects of the disclosure.

Referring to FIG. 13, a first distance, a second distance, and a closest approach distance in the slit-cutting device 200 will be defined. An absolute value of the first distance may be a shortest distance between an extension of the medium faceable area 75 of the first holder 70 and the first contactable portion 93, and correspond to a dimension G1. An absolute value of the second distance may be a shortest distance between an extension of the cutting edge 41 of the blade 46 of the second holder 49 and the second contactable portion 63, and correspond to a dimension G2. A closest approach distance may be a shortest distance between the medium faceable area 75 and the cutting edge 41 when the first contactable portion 93 and the second contactable portion 63 are in contact with each other. The closest approach distance corresponds to a dimension G3. In the slit-cutting device 200, the first distance is represented by a positive real number, and the second distance is represented by a negative real number. The closest approach distance may be a value greater than 0 (zero) which is represented by a sum of the first distance and the second distance. The closest approach distance may be equal to or less than a thickness of the release material layer 13C (refer to FIG. 3) of the multi-layered sheet 24. The closest approach distance is less than the protruding amount of each wall 79 from the medium faceable area 79 (e.g., the dimension L2 of FIG. 12).

Figure 11:
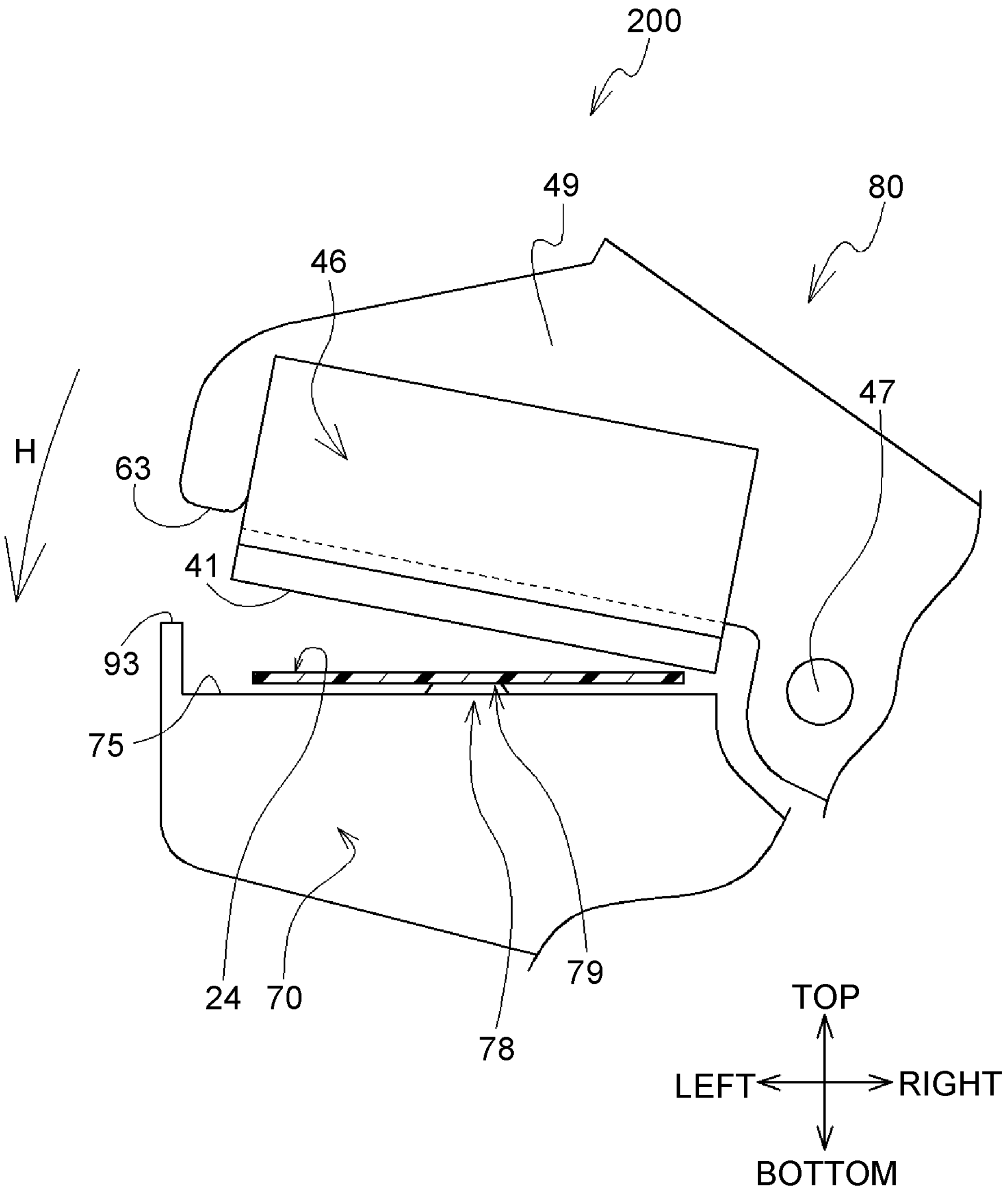
FIG. 11 is a front view of a slit-cutting device when a blade is located at a non-cutting position in a second illustrative embodiment according to one or more aspects of the disclosure.
Figure 12:
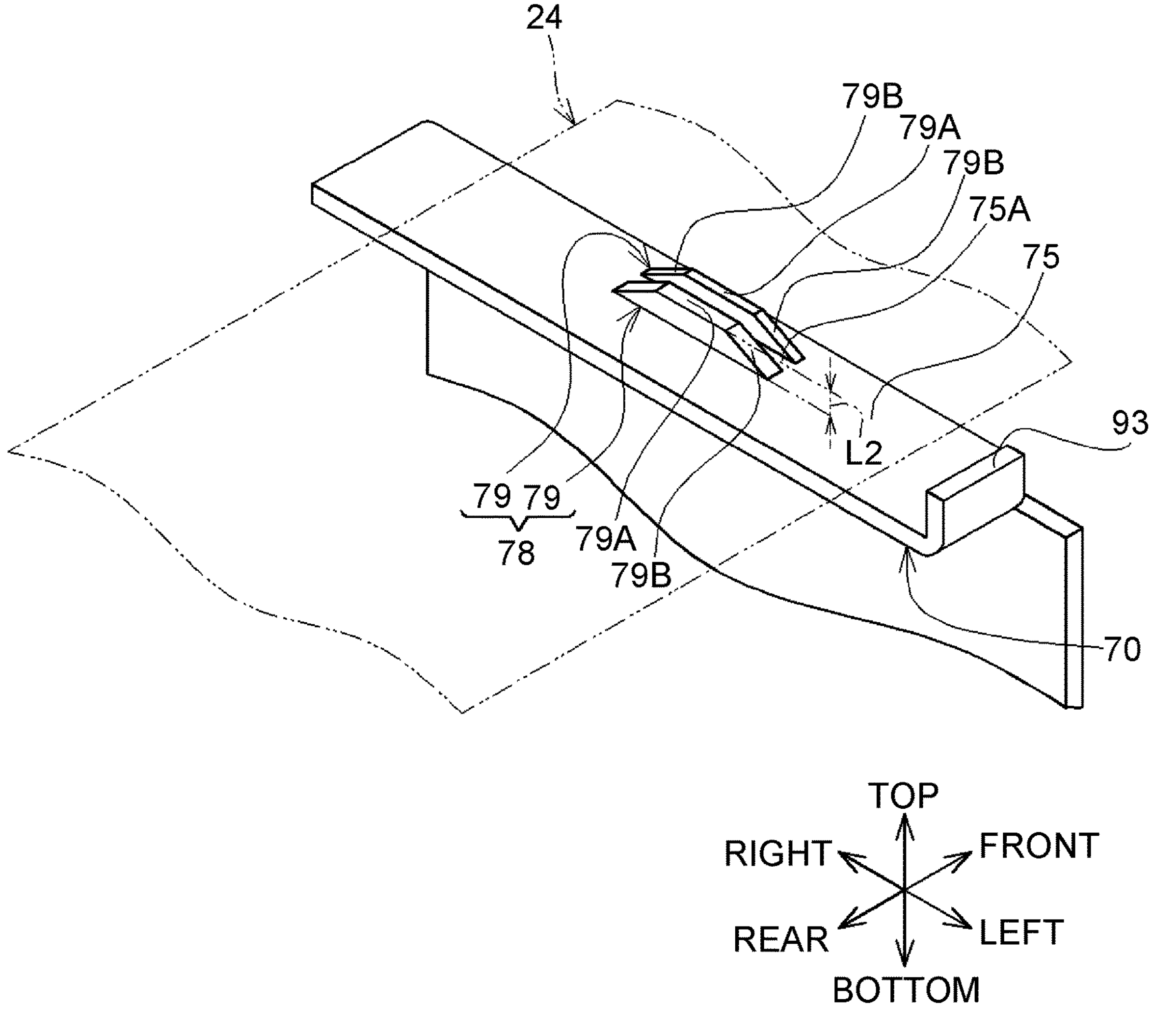
FIG. 12 is a perspective view of a protrusion in the second illustrative embodiment according to one or more aspects of the disclosure.
Figure 14:
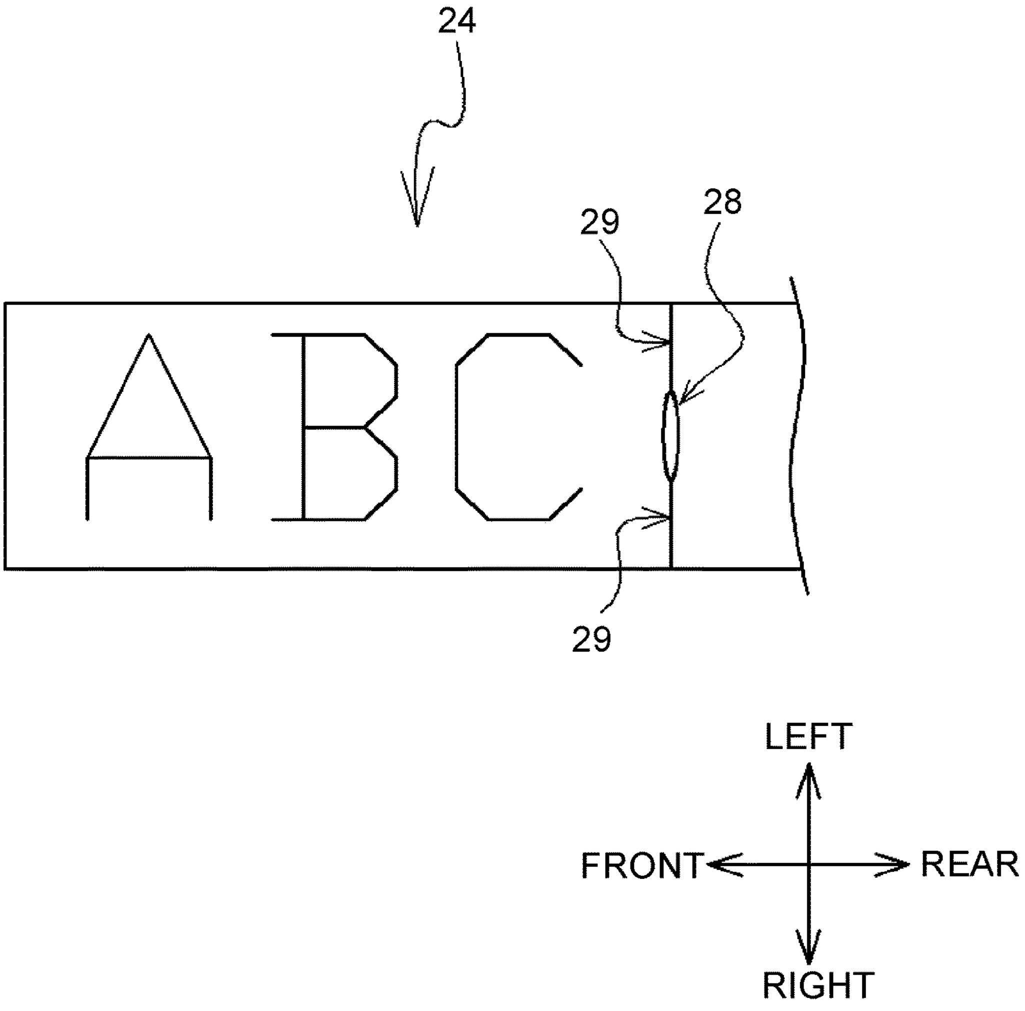
FIG. 14 is a top view of a multi-layered sheet having a slit line formed in a slit-cutting operation performed by the slit-cutting device in the second illustrative embodiment according to one or more aspects of the disclosure.

Referring to FIGS. 11, 13, and 14, an operation performed by the slit-cutting device 200 will be described. The blade 46 and the second holder 49 pivot on the support shaft 47 toward the first holder 70 (e.g., an arrow H of FIG. 11) by driving of the motor 51 (refer to FIG. 4). The protruding amount of each wall 79 from the medium faceable area 75 is greater than or equal to the closest approach distance. Therefore, before the second contactable portion 63 contacts the first contactable portion 93, the cutting edge 41 enters between the walls 79 by penetrating through the multi-layered sheet 24 that faces the upper end surfaces 79A of the walls 79. Thus, the cutting edge 41 cuts a penetrating slit into a middle portion of the multi-layered sheet 24 in the medium width direction. The middle portion of the multi-layered sheet 24 faces the upper end surfaces 79A of the walls 79. In this state, the cutting edge 41 and the medium faceable area 75 sandwich the other portions of the multi-layered sheet 24 therebetween. The other portions of the multi-layered sheet 24 do not face the protrusion 78 and are located to the right and left, respectively, of the protrusion 78. As the first contactable portion 63 and the second contactable portion 93 contact each other, the blade 46 reaches the cutting position and the motor 51 (refer to FIG. 4) stops driving for pivoting the first holder 71. In this state, the cutting edge 41 extends linearly in the right-left direction. The closest approach distance is less than a thickness of the multi-layered sheet 24. Therefore, when the blade 46 reaches the cutting position, the cutting edge 41 cuts non-penetrating slits into the multi-layered sheet 24 at respective locations to the right and left of the protrusion 78. Thus, the slit-cutting device 200 may cut, into the multi-layered sheet 24, a slit line including a non-penetrating slit 29, a penetrating slit 28, and another non-penetrating slit 29 successively, along the entire width of the multi-layered sheet 24 (refer to FIG. 14).

According to the second illustrative embodiment, the range in which the second holder 49 supported by the support shaft 47 moves relative to the first holder 70 corresponds to the range in which the cutting edge 41 moves closer to or away from the multi-layered sheet 24. The cutting edge 41 cuts a penetrating slit into the multi-layered sheet 24 at the location where the cutting edge 41 faces the protrusion 78, and also cuts non-penetrating slits into the multi-layered sheet 24 at the other locations where the cutting edge 41 does not face the protrusion 78. Accordingly, the slit-cutting device 200 may cut a predetermined slit line including both the non-penetrating slits and the penetrating slit, into the multi-layered sheet 24, along the cutting edge 41 of the blade 46 located at the cutting position, in a single slit-cutting operation. Accordingly, the second illustrative embodiment may implement the slit-cutting device 200 that may cut, into the multi-layered sheet 24, a predetermined slit line including both a non-penetrating slit and a penetrating slit, across the multi-layered sheet 24 with respect to the medium width direction, in a single slit-cutting operation.

The protrusion 78 is disposed at the medium faceable area 75 of the first holder 70 such that the protrusion 78 may face a substantially middle portion of the multi-layered sheet 24 facing the medium faceable area 75 in the medium width direction. This configuration may therefore enable the slit-cutting device 200 to cut a penetrating slit into a substantially middle portion of the multi-layered sheet 24 in the medium width direction. Thus, the user may put a fingertip at the penetrating slit formed in the substantially middle portion of the multi-layered sheet 24 in the medium width direction to remove the outer layer sheet 8 and the base layer 13A from the release material layer 13C. Such a multi-layered sheet 24 may therefore enable the user to easily remove the outer layer sheet 8 and the base layer 13A from the release material layer 13C.

Figure 15:
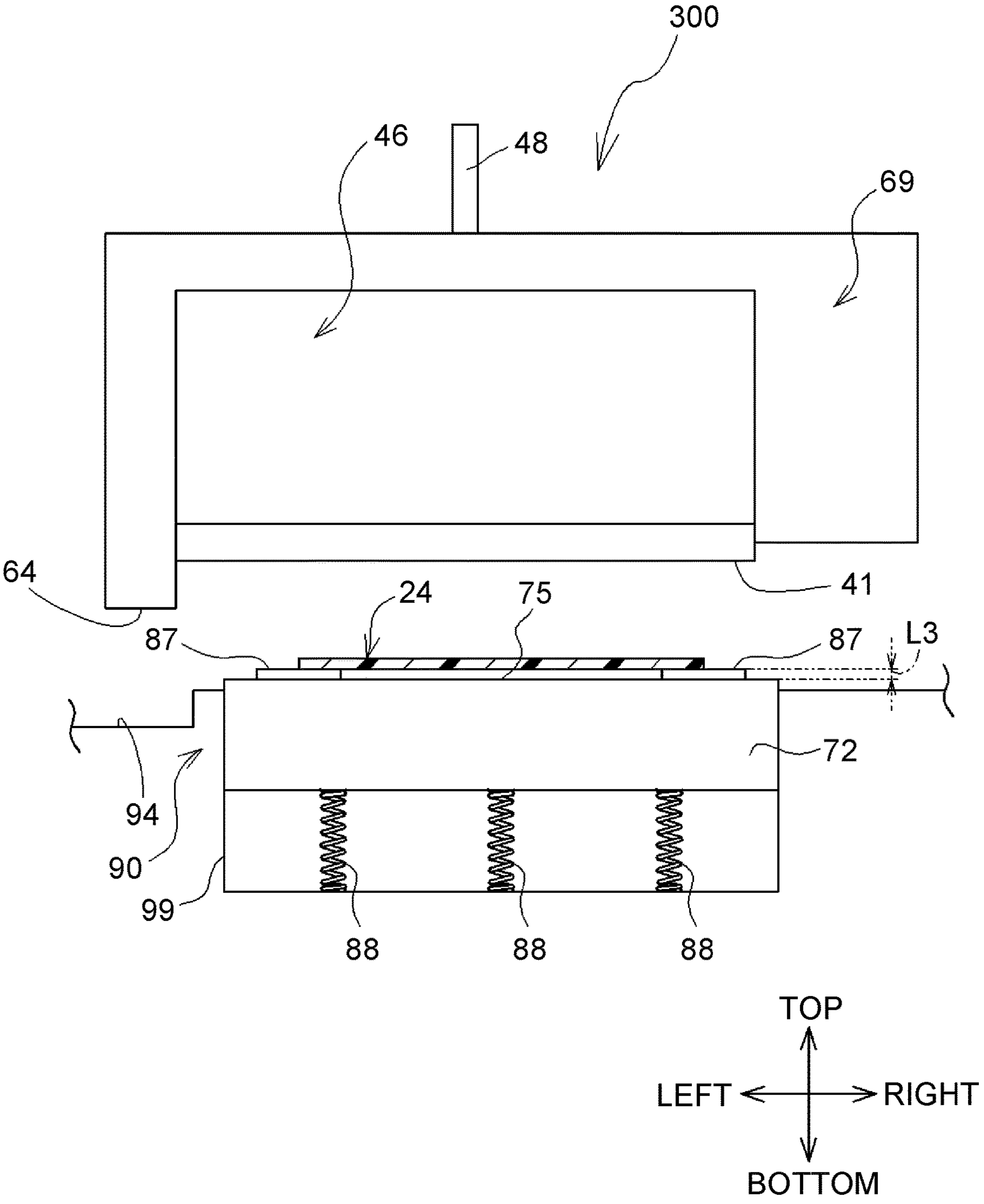
FIG. 15 is a front view of a slit-cutting device when a blade is located at a non-cutting position in a third illustrative embodiment according to one or more aspects of the disclosure.
Figure 16:
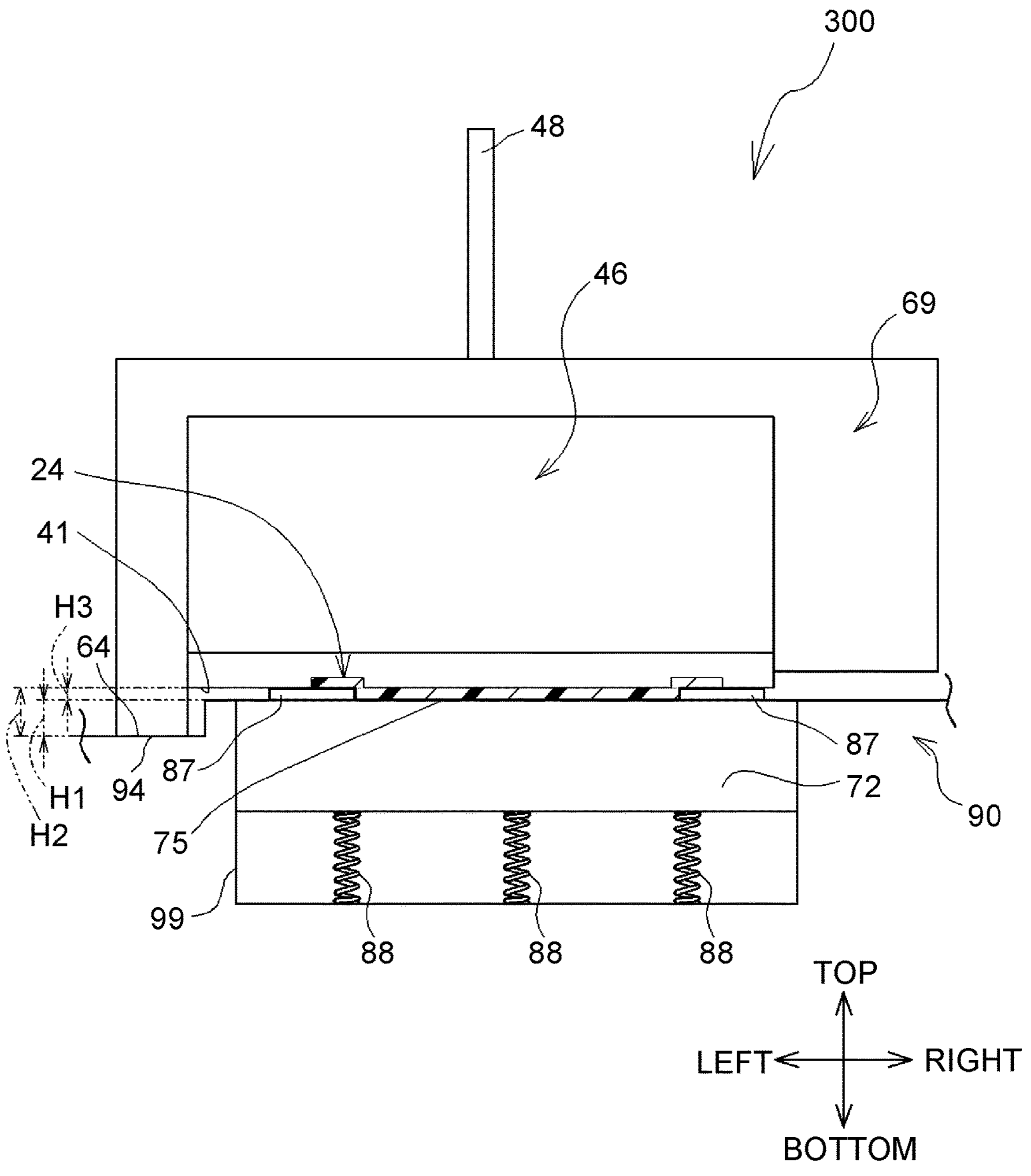
FIG. 16 is a front view of the slit-cutting device when the blade is located at a cutting position in the third illustrative embodiment according to one or more aspects of the disclosure.

Referring to FIGS. 15 and 16, a slit-cutting device 300 according to a third illustrative embodiment will be described. An explanation will be given mainly for the parts different from the slit-cutting device 100 of the first illustrative embodiment, and an explanation will be omitted for the common components by assigning the same reference numerals thereto. [0066] The slit-cutting device 300 includes a slide rail 48, a second holder 69, a support table 90, a first holder 72, elastic members 88, a first contactable portion 94, and protrusions 87. The slide rail 48 includes a fixed rail (not illustrated) and a movable rail (not illustrated). The fixed rail is fixed to the inside of the case 5 (refer to FIG. 2) and extends in the top-bottom direction. The movable rail extends in the top-bottom direction. The movable rail is connected to the fixed rail so as to be movable relative to the fixed rail in the top-bottom direction. The second holder 69 is fixed to the movable rail of the slide rail 48. Therefore, the second holder 69 is supported by the slide rail 48 so as to be movable up and down and is movable relative to the first holder 72. The second holder 69 supports a blade 46. The blade 46 has a cutting edge 41 at its lower edge. The cutting edge 41 extends linearly in the right-left direction. The second holder 69 is connected to the lever disposed at the case 5. In response to a user's operation of the lever, the second holder 69 moves up and down via the slide rail 48 to move the blade 46 between a non-cutting position (refer to FIG. 15) and a cutting position (refer to FIG. 16).

The support table 90 is disposed below the second holder 69 and is fixed facing the second holder 69. The support table 90 has a recessed portion 99 that is recessed downward. The first holder 72 is disposed in the recessed portion 99 so as to be movable up and down. The first holder 72 has a dimension in the top-bottom direction (e.g., a height) shorter than a dimension in the top-bottom direction (e.g., a depth) of the recessed portion 99. The first holder 72 has a medium faceable area 75 at its upper end surface. The medium faceable area 75 may face the multi-layered sheet 24. The medium faceable area 75 may face the cutting edge 41 in the top-bottom direction. The medium faceable area 75 may face the release material layer 13C (refer to FIG. 3) of the multi-layered sheet 24. The elastic members 88 are disposed in the recessed portion 99. The elastic members 88 urge the first holder 72 upward. Each of the elastic members 88 may be, for example, a compression spring. Each of the elastic members 88 has a lower end that is fixed to the recessed portion 99, and an upper end that is fixed to a lower end of the first holder 72. The first holder 72 and the elastic members 88 each has a dimension in the top-bottom direction such that a sum of the dimension of the first holder 72 in the top-bottom direction and a length of an elastic member 88 in a most contracted state is less than a distance between a bottom end of an open space where the first holder 72 is disposed in the recessed portion 99 and an upper end of the open space of the recessed portion 99. When the blade 46 is located at the non-cutting position, the upper end surface of the first holder 72, i.e., the medium faceable area 75, is located slightly above the upper end of the open space of the recessed portion 99 (refer to FIG. 15). In the state where the blade 46 is located at the non-cutting position, a distance between the medium faceable area 75 and the bottom end of the open space of the recessed portion 99 may be greater than the sum of the dimension of the first holder 72 in the top-bottom direction and the length of an elastic member 88 in the most contracted state. In other embodiments, if the end portions of the cutting edge 41 in the right-left direction are located inside the open space of the recessed portion 99 in the right-left direction, the medium faceable area 75 might not necessarily be located above the upper end of the recessed portion 99. The first contactable portion 94 is included in the support table 90. In the third illustrative embodiment, the support table 90 includes another recessed portion that includes the first contactable portion 94 at its bottom. The first contactable portion 94 constitutes a portion of an upper end surface of the support table 90. The first contactable portion 94 is located below the upper end of the recessed portion 99.

Each of the protrusions 87 may be a plate-shaped metallic member and may be made of material harder than the cutting edge 41. The protrusions 87 are disposed with partially overlapping a left end portion and a right end portion, respectively, of the medium faceable area 75. The protrusions 87 are connected to the elastic members 88 indirectly via the first holder 72. That is, force that the protrusions 87 has received from the cutting edge 41 transfers to the first holder 72 and further transfers to the elastic members 88. The protrusions 87 may face the right and left ends, respectively, of the release material layer 13C (refer to FIG. 3) of the multi-layered sheet 24. A protruding amount of each protrusion 87 that protrudes from the medium faceable area 75 toward the cutting edge 41 corresponds to a dimension L3. The second holder 69 includes a second contactable portion 64. The second holder 69 includes a protruding portion disposed to the left of the cutting edge 41. The protruding portion protrudes relative to the cutting edge 41. The protruding portion includes the second contactable portion 64 at its protruding end. The second contactable portion 63 is a flat surface extending in the front-rear direction and in the right-left direction. The second contactable portion 63 faces the first contactable portion 94 in the top-bottom direction. The second contactable portion 64 needs to be disposed on at least one of the right side and the left side of the cutting edge 41. Therefore, in other embodiments, for example, the second contactable portion 64 may be disposed to the right of the cutting edge 41.

Referring to FIG. 16, a first distance, a second distance, and a closest approach distance in the slit-cutting device 300 will be defined. An absolute value of the first distance may be a shortest distance between an extension of the medium faceable area 75 of the first holder 72 and the first contactable portion 94 of the support table 90, and correspond to a dimension H1. An absolute value of the second distance may be a shortest distance between an extension of the cutting edge 41 of the blade 46 of the second holder 69 and the second contactable portion 64, and correspond to a dimension H2. The closest approach distance may correspond to a dimension H3. In the slit-cutting device 300, the first distance is represented by a negative real number, and the second distance is represented by a positive real number. The closest approach distance may be a shortest distance between the medium faceable area 75 and the cutting edge 41 when the first contactable portion 94 and the second contactable portion 64 are in contact with each other. The closest approach distance is greater than 0 (zero) which is the sum of the first distance and the second distance. The closest approach distance is less than the thickness of the multi-layered sheet 24. In the third illustrative embodiment, the closest approach distance is equal to the protruding amount of each protrusion 87 from the medium faceable area 75 (e.g., a dimension L3 of FIG. 15).

Referring to FIGS. 15 and 16, an operation performed by the slit-cutting device 300 will be described. The user operates the lever to move the second holder 69 downward. In response to this, the blade 46 moves downward from the non-cutting position. The protruding amount of each protrusion 87 from the medium faceable area 75 (e.g., the dimension L3 of FIG. 15) is greater than or equal to the closest approach distance. Therefore, before the second contactable portion 64 contacts the first contactable portion 94, the cutting edge 41 and the protrusions 87 sandwiches the multi-layered sheet 24 therebetween.

The blade 46 further moves downward to cause the cutting edge 41 and the medium faceable area 75 to sandwich the multi-layered sheet 24 therebetween. In accordance with the downward movement of the blade 46, the first holder 72 moves downward against elastic force of the elastic members 88. In other words, elastic deformation of the elastic members 88 allow the downward movement of the first holder 72. As elastic deformation of the elastic members 88 increases, the elastic force that the elastic members 88 apply to the first holder 72 increases correspondingly. This therefore increases the force that the cutting edge 41 and the protrusions 87 sandwich the multi-layered sheet 24 therebetween and the force that the cutting edge 41 and the medium faceable area 75 sandwich the multi-layered sheet 24 therebetween.

Before the second contactable portion 64 contacts the first contactable portion 94, the cutting edge 41 cuts penetrating slits into the multi-layered sheet 24 at respective locations where the cutting edge 41 faces the protrusions 87, and thus the cutting edge 41 contacts the protrusions 87. Simultaneously, the cutting edge 41 cuts a non-penetrating slit into the multi-layered sheet 24 at another location where the cutting edge 41 faces the medium faceable area 75. Therefore, a slit line including a penetrating slit 28, a non-penetrating slit 29, and another penetrating slit 28 successively is cut into the multi-layered sheet 24 across the multi-layered sheet 24 with respect to the medium width direction. When the second contactable portion 64 contacts the first contactable portion 94, the blade 46 reaches the cutting position. When the blade 46 is located at the cutting position, the blade 46 presses the first holder 72 via the multi-layered sheet 24 and thus the medium faceable area 75 is flush with the upper end of the recessed portion 99 (refer to FIG. 16).

According to the third illustrative embodiment, the range in which the second holder 69 supported by the slide rail 48 moves relative to the first holder 72 corresponds to the range in which the cutting edge 41 moves closer to or away from the multi-layered sheet 24. The cutting edge 41 cuts penetrating slits into the multi-layered sheet 24 at respective locations where the cutting edge 41 faces the protrusions 87, and also cuts a non-penetrating slit into the multi-layered sheet 24 at another location where the cutting edge 41 face the medium faceable area 75. Accordingly, the slit-cutting device 300 may cut, into the multi-layered sheet 24, a slit line including both the non-penetrating slit and the penetrating slits, across the multi-layered sheet 24 with respect to the medium width direction, along the cutting edge 41 located at the cutting position, in a single slit-cutting operation. Accordingly, the third illustrative embodiment may implement the slit-cutting device 300 that may cut, into the multi-layered sheet 24, a predetermined slit line including both a non-penetrating slit and a penetrating slit, in a single slit-cutting operation.

Figure 17:
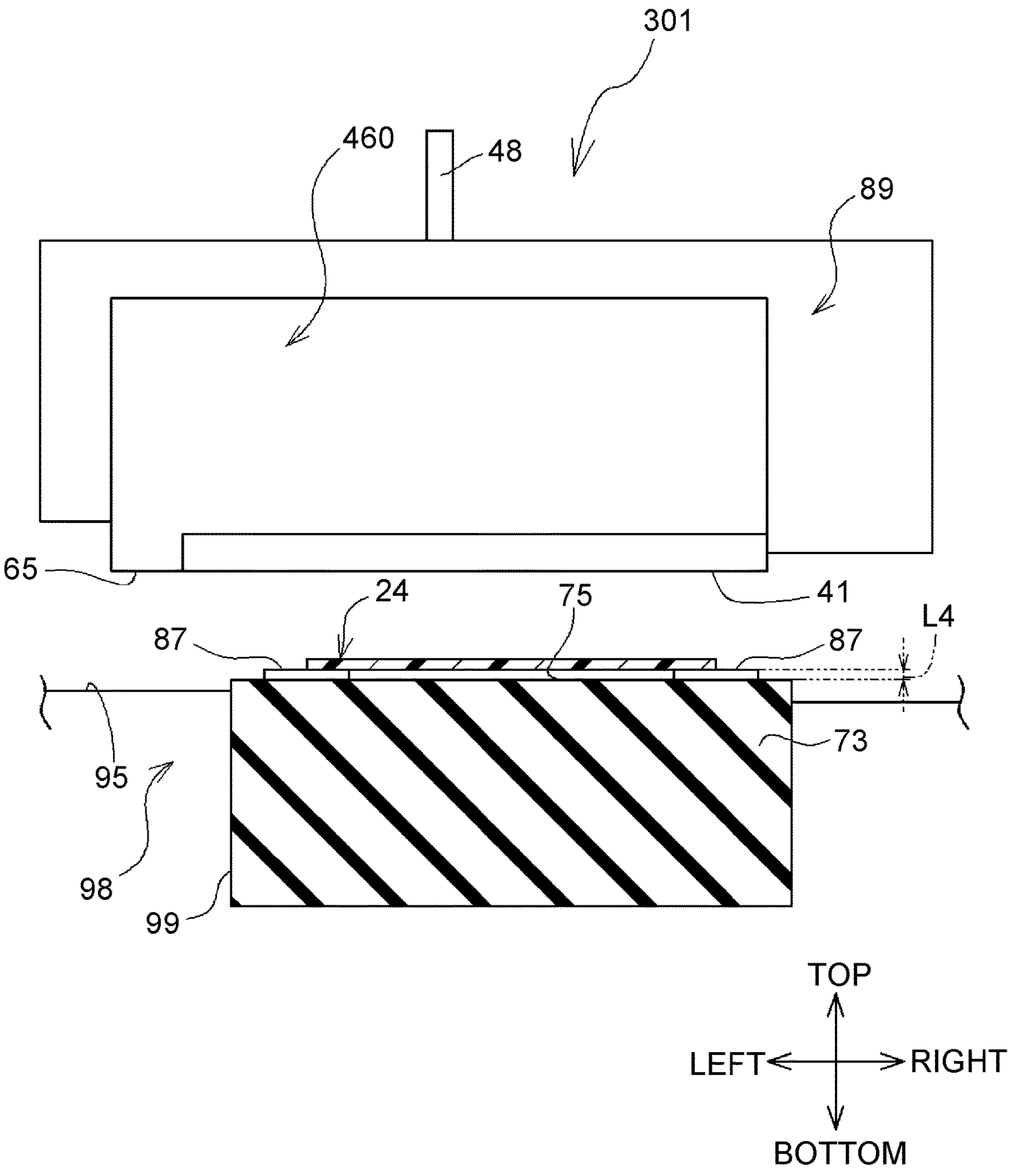
FIG. 17 is a front view of a slit-cutting device when a blade is located at a non-cutting position in a variation of the third illustrative embodiment according to one or more aspects of the disclosure.
Figure 18:
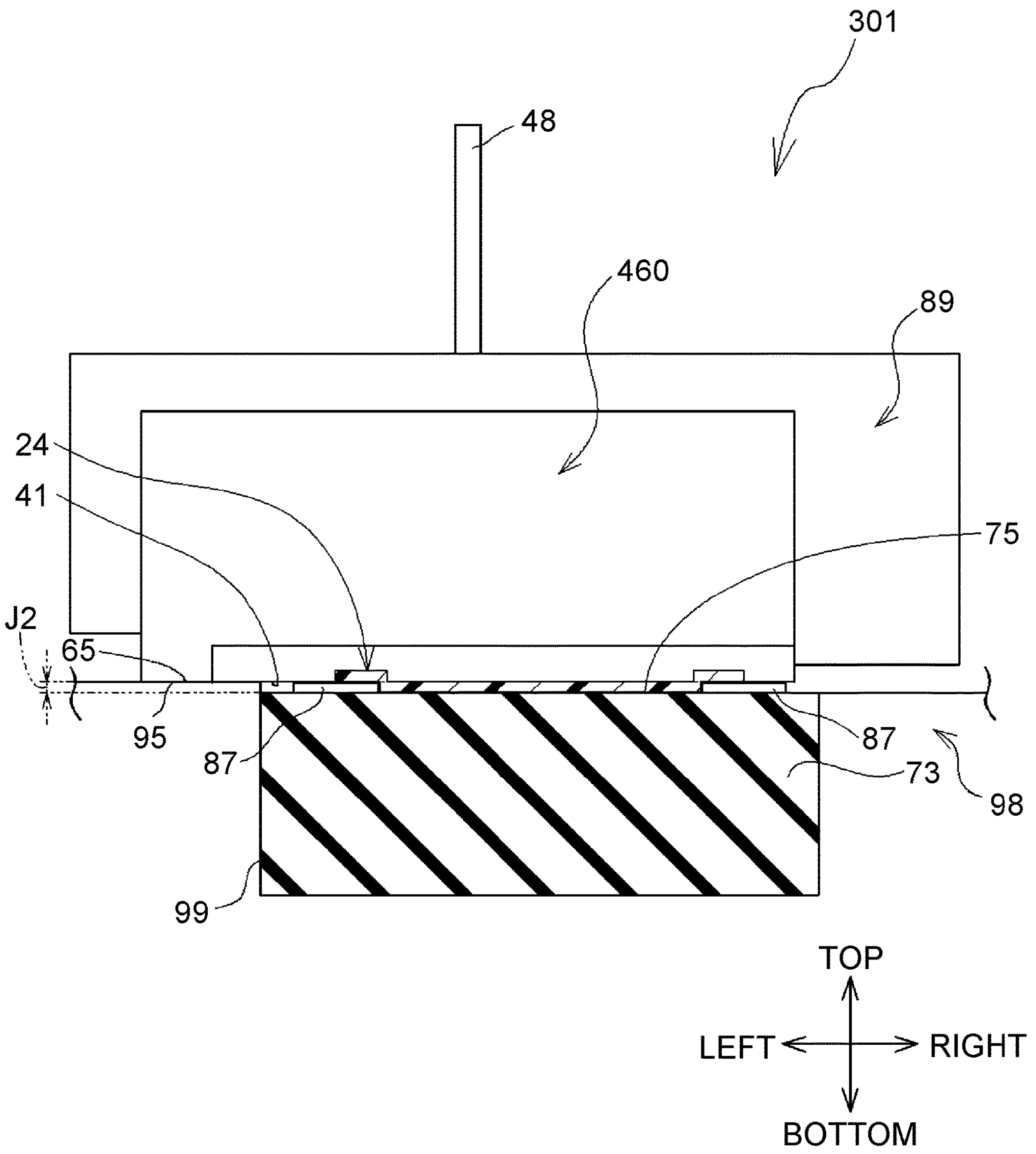
FIG. 18 is a front view of the slit-cutting device when the blade is located at a cutting position in the variation of the third illustrative embodiment according to one or more aspects of the disclosure.

Various changes or modifications may be applied to the slit-cutting device 300. Referring to FIGS. 17 and 18, a slit-cutting device 301 which may be a variation of the slit-cutting device 300 will be described. An explanation will be given mainly for the parts different from the slit-cutting device 300 of the third illustrative embodiment, and an explanation will be omitted for the common components by assigning the same reference numerals thereto.

The slit-cutting device 301 includes a support table 98 instead of the support table 90. The support table 98 has a recessed portion 99. A first holder 73, which is different from the first holder 72, is disposed in the recessed portion 99. The first holder 73 is made of an elastically deformable material. The first holder 73 has a medium faceable area 75 at its upper end surface. When a blade 460 is located at the non-cutting position, the medium faceable area 75 is located above the upper end of the recessed portion 99. In FIGS. 17 and 18, for purposes of clear illustration, the first holder 73 is hatched.

A plurality of protrusions 87 are disposed at the medium faceable area 75. The protrusions 87 are connected to the first holder 87 directly. That is, force that the protrusions 87 has received from the cutting edge 41 transfers to the first holder 73 from the protrusions 87. The support table 98 includes a first contactable portion 95. The first contactable portion 95 is a flat surface that constitutes a portion of an upper end surface of the support table 98 and that extends in the horizontal direction. The first contactable portion 95 is flush with the upper end of the recessed portion 99.

The slit-cutting device 301 further includes a second holder 89 instead of the second holder 69. The second holder 89 is supported by the slide rail 48 so as to be movable up and down. The second holder 89 is connected to the lever (not illustrated) disposed at the case 5. The slit-cutting device 301 includes the blade 460 instead of the blade 46. The blade 460 includes a cutting edge 41 and a second contactable portion 65 that is disposed at a different position than the cutting edge 41. The second contactable portion 65 is a flat surface that extends in the horizontal direction. The second contactable portion 65 is flush with the cutting edge 41 of the blade 46.

Referring to FIG. 18, a first distance, a second distance, and a closest approach distance in the slit-cutting device 301 will be defined. An absolute value of the first distance when the first contactable portion 95 and the second contactable portion 65 are in contact with each other correspond to a dimension J2. The second distance is 0 (zero). The first distance is represented by a positive real number. The closest approach distance is equal to the first distance (e.g., the dimension H2) and less than the thickness of the multi-layered sheet 24. The closest approach distance is equal to the protruding amount of each protrusion 87 from the medium faceable area (e.g., a dimension L4 of FIG. 17).

Similar to the slit-cutting device 300, in the slit-cutting device 301, the user manually operates the lever to move the blade 46 from the non-cutting position to the cutting position. Before the second contactable portion 65 contacts the first contactable portion 95, the cutting edge 41 penetrates into some layers of the multi-layered sheet 24 at locations where the cutting edge 41 faces the protrusions 87 and sandwiches the multi-layered sheet 24 in cooperation with the medium faceable area 75 at a location where the cutting edge 41 faces the medium faceable area 75. Elastic deformation of the first holder 73 allows the downward movement of the protrusions 87. When the second contactable portion 65 contacts the first contactable portion 95, the blade 460 reaches the cutting position (refer to FIG. 18). The cutting edge 41 cuts penetrating slits into the multi-layered sheet 24 at respective locations where the cutting edge 41 faces the protrusions 87, and also cuts a non-penetrating slit into the multi-layered sheet 24 at another location where the cutting edge 41 face the medium faceable area 75.

Figure 19:
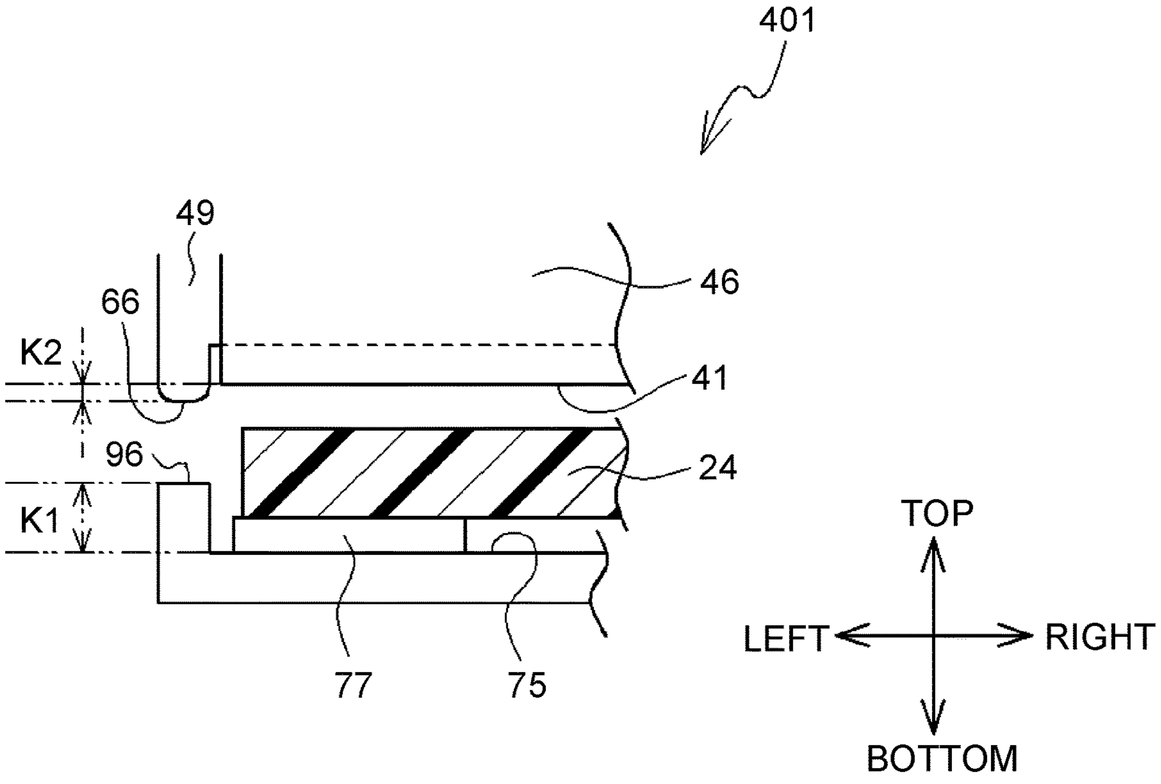
FIG. 19 is a front view of a slit-cutting device in another variation of the first illustrative embodiment according to one or more aspects of the disclosure.

Referring to FIG. 19, a slit-cutting device 401 which may be a variation of the slit-cutting device 100 of the first illustrative embodiment will be described. The slit-cutting device 401 includes a first contactable portion 96 and a second contactable portion 66. The first holder 70 includes a protruding portion that protrudes relative to the medium faceable area 75 toward the cutting edge 41. The protruding portion of the first holder 70 includes the first contactable portion 96 at its top end. The second holder 49 includes a protruding portion that protrudes relative to the cutting edge 41 toward the medium faceable area 75. The protruding portion of the second holder 49 includes the second contactable portion 66 at its bottom end. The first distance when the first contactable portion 96 and the second contactable portion 66 are in contact with each other is represented by a positive real number similar to the slit-cutting device 200 (refer to FIG. 13) and corresponds to a dimension K1. The second distance when the first contactable portion 96 and the second contactable portion 66 are in contact with each other is represented by a positive real number similar to the slit-cutting device 100 (refer to FIG. 6) and corresponds to a dimension K2. In the slit-cutting device 401, similar to the above-described illustrative embodiments, the closest approach distance is a value represented by the sum of the first distance and the second distance.

According to the one or more aspects of the disclosure, in a single slit-cutting operation, the cutting edge may cut a penetrating slit into the medium at a location where the cutting edge faces the protrusion, and also cut a non-penetrating slit into the medium at another location where the cutting edge faces the medium faceable area. Therefore, the slit-cutting device may cut both a non-penetrating slit and a penetrating slit in the medium along the cutting edge in a single slit-cutting operation. Accordingly, some embodiments of the disclosure may implement the slit-cutting device that may cut a predetermined slit line including both a non-penetrating slit and a penetrating slit, into a medium in a single slit-cutting operation.

What is claimed is:

1. A printer comprising:

a thermal head configured to print a medium having a width;

a feeding roller configured to convey the medium located downstream, in a conveyance direction; and a slit-cutting device located downstream, in the conveyance direction, of the feeding roller, wherein the slit-cutting device comprises:

a first holder comprising a first contactable member and a first surface configured to support the medium along the width of the medium;

a blade with a cutting edge, of a length between a first end of the blade and a second end of the blade, configured to contact the medium along a first direction, the first direction being parallel to the first surface and perpendicular to the conveyance direction;

a second holder configured to support the blade and configured to move relative to the first holder, the second holder comprising a second contactable member configured to contact the first contactable member; and two parallel walls located on the first surface and spaced, via a second surface, from each other in the conveyance direction, wherein a top surface of a central portion of each wall is parallel to the first surface, wherein the second surface and the first contactable member are aligned in the first direction, wherein the cutting edge is formed in a straight line, wherein the two parallel walls extend in the first direction perpendicular to the conveyance direction for a distance less than the length of the cutting edge, wherein the two parallel walls extend in the first direction perpendicular to the conveyance direction for a distance less than the width of the medium, wherein the two parallel walls are spaced, in the first direction, from each of the first end of the cutting edge and the second end of the cutting edge, wherein the cutting edge is located between the two parallel walls and configured to fully penetrate through a first portion of the medium spanning the two parallel walls in the first direction, when the second contactable member contacts the first contactable member, and wherein the cutting edge, when the second contactable member contacts the first contactable member, is separated from the first surface by a distance greater than zero and is configured to not fully penetrate through a second portion of the medium located in the first direction relative to the first portion of the medium.

2. The printer according to claim 1, further comprising:

a support member having an axis about which the first holder and the second holder pivot relative to each other, wherein the axis is spaced from the second contactable member in the first direction.

3. The printer according to claim 1, wherein the two parallel walls comprise a first wall and a second wall, wherein the first wall comprises a first side end surface and a second side end surface spaced from the first side end surface in the first direction, wherein the second wall comprises a third side end surface and a fourth side end surface spaced from the third side end surface in the first direction, and wherein each of the first side end surface, the second side end surface, the third side end surface and the fourth side end surface is inclined relative to a second direction perpendicular to each of the conveyance direction and the first direction.

* * * * *